(12) United States Patent
Sinofsky et al.

(10) Patent No.: US 11,386,603 B2
(45) Date of Patent: Jul. 12, 2022

(54) CONTROLLING ELECTRICAL COMPONENTS USING GRAPHICS FILES

(71) Applicant: Illumina, Inc., San Diego, CA (US)

(72) Inventors: Brian Sinofsky, San Diego, CA (US); Kirkpatrick Norton, San Diego, CA (US); Soham Sheth, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 35 days.

(21) Appl. No.: 17/247,133

(22) Filed: Dec. 1, 2020

(65) Prior Publication Data

US 2021/0183126 A1 Jun. 17, 2021

Related U.S. Application Data

(60) Provisional application No. 62/945,085, filed on Dec. 6, 2019.

(51) Int. Cl.
*G06T 13/20* (2011.01)
*G06F 1/28* (2006.01)

(52) U.S. Cl.
CPC .......... *G06T 13/20* (2013.01); *G06F 1/28* (2013.01)

(58) Field of Classification Search
CPC ......... G06T 13/20; G06T 3/40; G06T 7/0004; G06T 7/90; G06T 13/80; G06T 2207/30164; G06F 1/28; G06F 1/165; G06F 1/181; G06F 1/1656; G09G 5/00; G09G 5/38

See application file for complete search history.

(56) References Cited

U.S. PATENT DOCUMENTS

| | | | |
|---|---|---|---|
| 5,896,292 A | 4/1999 | Hosaka et al. | |
| 6,912,305 B1* | 6/2005 | Finlayson | H04N 19/503 382/245 |
| 7,550,931 B2 | 6/2009 | Lys et al. | |
| 9,488,916 B2 | 11/2016 | Bourke, Jr. et al. | |
| 2007/0035322 A1 | 2/2007 | Kang et al. | |
| 2008/0122764 A1 | 5/2008 | Huang et al. | |
| 2010/0149091 A1* | 6/2010 | Kota | G06F 9/45512 715/234 |

(Continued)

FOREIGN PATENT DOCUMENTS

| | | |
|---|---|---|
| EP | 1955112 B1 | 3/2015 |
| EP | 2052407 B1 | 7/2015 |

(Continued)

OTHER PUBLICATIONS

International Search Report and Written Opinion for PCT Application No. PCT/US2020/070833, dated Apr. 1, 2021, 10 pages.

(Continued)

*Primary Examiner* — Maurice L. McDowell, Jr.
(74) *Attorney, Agent, or Firm* — Brake Hughes Bellermann LLP

(57) ABSTRACT

A method comprises: accessing animation graphics files and a mask graphics file; generating first binary sequences corresponding to the animation graphics files, and generating a second binary sequence corresponding to the mask graphics file; and outputting the first binary sequences and the second binary sequence to hardware controlling an array of electrical components.

20 Claims, 13 Drawing Sheets
(2 of 13 Drawing Sheet(s) Filed in Color)

(56) References Cited

U.S. PATENT DOCUMENTS

| | | | |
|---|---|---|---|
| 2013/0170733 A1 | 7/2013 | Leu | |
| 2014/0277623 A1* | 9/2014 | Love | A63J 1/028 |
| | | | 700/86 |
| 2015/0370520 A1* | 12/2015 | Durlach | G09G 5/00 |
| | | | 348/488 |
| 2017/0135169 A1 | 5/2017 | Panek et al. | |
| 2018/0033397 A1 | 2/2018 | Huang et al. | |
| 2019/0304110 A1 | 10/2019 | Walecki et al. | |

FOREIGN PATENT DOCUMENTS

| | | |
|---|---|---|
| EP | 3244712 A1 | 11/2017 |
| JP | 2018504627 A | 2/2018 |
| TW | 200707614 A | 2/2007 |
| TW | 201330135 A | 7/2013 |
| WO | 2016/090331 A1 | 6/2016 |

OTHER PUBLICATIONS

Office Action for Taiwan Patent Application No. 109139725, dated Aug. 5, 2021, along with English translation, 7 pages.

* cited by examiner

CONTROLLING ELECTRICAL
COMPONENTS USING GRAPHICS FILES

CROSS-REFERENCE TO RELATED
APPLICATION

This application is a continuation of, and claims priority to, U.S. Provisional Patent Application No. 62/945,085, filed on Dec. 6, 2019, and entitled "CONTROLLING ELECTRICAL COMPONENTS USING GRAPHICS FILES," the disclosure of which is incorporated by reference herein in its entirety.

BACKGROUND

Electrical components can be incorporated into systems to coordinate their behavior. Such control is sometimes implemented in form of software control, where a processor executes instructions formulated in machine-readable code to cause the electrical components to operate accordingly. However, such control can be considered to be relatively high-level and complicated, in that it requires the apparatus to have a sophisticated architecture, and it may be prone to interruption or erratic behavior. What is needed is a hardware-implemented control architecture that allows systems of electrical components to perform complex and dynamically modifiable operations at a high rate of flexibility.

SUMMARY

In a first aspect, a method comprises: accessing animation graphics files and a mask graphics file; generating first binary sequences corresponding to the animation graphics files, and generating a second binary sequence corresponding to the mask graphics file; and outputting the first binary sequences and the second binary sequence to hardware controlling an array of electrical components.

Implementations can include any or all of the following features. Outputting the first binary sequences and the second binary sequence comprises transmitting a binary file including the first binary sequences and the second binary sequence. The animation graphics files and the mask graphics file have a common graphics file type. The common graphics file type supports lossless data compression. At least one of the animation graphics files or the mask graphics file has eight bits per color. At least one of the animation graphics files or the mask graphics file has 16 bits per color. At least one of the animation graphics files or the mask graphics file has three planes. At least one of the animation graphics files or the mask graphics file has four planes. The method further comprises reading a first flag to distinguish the animation graphics files from the mask graphics file. At least one of generating the first binary sequences or generating the second binary sequence comprises reading a second flag indicating processing direction. The method further comprises operating the array of electrical components using the first binary sequences and the second binary sequence.

In a second aspect, a computer program product stored in a non-transitory medium includes instructions that when executed by a processor cause the processor to perform operations, the operations comprising: accessing animation graphics files and a mask graphics file; generating first binary sequences corresponding to the animation graphics files, and generating a second binary sequence corresponding to the mask graphics file; and outputting the first binary sequences and the second binary sequence to hardware controlling an array of electrical components.

In a third aspect, a method comprises: accessing a first animation graphics file, a second animation graphics file, a mask graphics file, and a predetermined electrical threshold value for an array of electrical components; performing pixel-by-pixel calculations on combinations of rows from the first animation graphics file and the second animation graphics file and the mask graphics file, each of the pixel-by-pixel calculations including determining a first scaled pixel value by multiplying a first animation pixel value from the first animation graphics file with a first mask pixel value from the mask graphics file, determining a second scaled pixel value by multiplying a second animation pixel value from the second animation graphics file with a second mask pixel value from the mask graphics file, and determining a sum of the first scaled pixel value and the second scaled pixel value; and generating an output that reflects whether an outcome of the pixel-by-pixel calculations exceeds the predetermined electrical threshold value for the array of electrical components.

Implementations can include any or all of the following features. Performing the pixel-by-pixel calculations comprises performing the pixel-by-pixel calculations on all possible combinations of rows from the first animation graphics file, the second animation graphics file and the mask graphics file. The output indicates that the outcome of the pixel-by-pixel calculations exceeds the predetermined electrical threshold value for the array of electrical components, and wherein the method further comprises adjusting at least one of the first animation graphics file, the second animation graphics file or the mask graphics file. The array of electrical components includes light-emitting diodes (LEDs), wherein the predetermined electrical threshold value includes an upper current limit, and wherein adjusting at least one of the first animation graphics file, the second animation graphics file or the mask graphics file comprises reducing a brightness value. The output indicates that the outcome of the pixel-by-pixel calculations does not exceed the predetermined electrical threshold value for the array of electrical components, and wherein the output further comprises a calculated electrical value describing the array of electrical components. The calculated electrical value comprises an average total current for all row combinations of the first animation graphics file, the second animation graphics file and the mask graphics file. The calculated electrical value comprises a highest total current among all row combinations of the first animation graphics file, the second animation graphics file and the mask graphics file. The array of electrical components includes light-emitting diodes (LEDs). The outcome of the pixel-by-pixel calculations comprises calculating an estimated current for each LED color of the LEDs based on data stored as pixels in the first animation graphics file and the second animation graphics file and the mask graphics file. The estimated current for each LED color of the LEDs is at least one of an average or a maximum current. The outcome of the pixel-by-pixel calculations comprises an estimated current for each LED of the LEDs. The estimated current for each LED of the LEDs is at least one of an average or a maximum current. Each row in the first animation graphics file and the second animation graphics file is associated with a frame in a pattern sequence defined by the first animation graphics file and the second animation graphics file and the mask graphics file, and wherein each pixel in the row is associated with a respective electrical component of the array of electrical components. Performing the pixel-by-pixel calculations comprises processing a first row of each of the first animation graphics file and the second animation graphics file and the mask graphics file, and subsequently processing a next row of each of the first animation graphics file and the second animation graphics file and the mask graphics file over multiple iterations. At least one of the first animation graphics file, the second animation graphics file or the mask graphics file has a different temporal length than another of the first animation graphics file, the second animation graphics file or the mask graphics file, the method further comprising beginning another loop of the at least one of the first animation graphics file, the second animation graphics file or the mask graphics file after reaching an end of the at least one of the first animation graphics file, the second animation graphics file or the mask graphics file. A series of rows in each of the first animation graphics file, the second animation graphics file and the mask graphics file is associated with a temporal flow of a pattern sequence defined by the first animation graphics file, the second animation graphics file and the mask graphics file. The first animation graphics file, the second animation graphics file and the mask graphics file have a common graphics file type. The common graphics file type supports lossless data compression. At least one of the first animation graphics file, the second animation graphics file or the mask graphics file has eight bits per color. At least one of the first animation graphics file, the second animation graphics file or the mask graphics file has 16 bits per color. At least one of the first animation graphics file, the second animation graphics file or the mask graphics file has three planes. At least one of the first animation graphics file, the second animation graphics file or the mask graphics file has four planes. Generating the output comprises presenting a message on a display device. The method further comprises operating the array of electrical components based on the first animation graphics file and the second animation graphics file.

In a fourth aspect, a computer program product stored in a non-transitory medium includes instructions that when executed by a processor cause the processor to perform operations, the operations comprising: accessing a first animation graphics file, a second animation graphics file, a mask graphics file, and a predetermined electrical threshold value for an array of electrical components; performing pixel-by-pixel calculations on combinations of rows from the first animation graphics file, the second animation graphics file and the mask graphics file, each of the pixel-by-pixel calculations including determining a first scaled pixel value by multiplying a first animation pixel value from the first animation graphics file with a first mask pixel value from the mask graphics file, determining a second scaled pixel value by multiplying a second animation pixel value from the second animation graphics file with a second mask pixel value from the mask graphics file, and determining a sum of the first scaled pixel value and the second scaled pixel value; and generating an output that reflects whether an outcome of the pixel-by-pixel calculations exceeds the predetermined electrical threshold value for the array of electrical components.

In a fifth aspect, a method comprising: accessing first binary sequences corresponding to animation graphics files, and a second binary sequence corresponding to a mask graphics file; combining portions of the first binary sequences with each other according to the second binary sequence, to generate a digital bitstream; and transmitting the digital bitstream to control an array of electrical components.

Implementations can include any or all of the following aspects. Each row in the animation graphics files is associated with a frame in a pattern sequence defined by the animation graphics files and the mask graphics file, and wherein each pixel in the row is associated with a respective electrical component of the array of electrical components. Combining the portions of the first binary sequences with each other comprises processing a first row of each of the animation graphics files and the mask graphics file, and subsequently processing a next row of each of the animation graphics files and the mask graphics file over multiple iterations. At least one of the animation graphics files or the mask graphics file has a different temporal length than another of the animation graphics files or the mask graphics file, the method further comprising beginning another loop of the at least one of the animation graphics files or the mask graphics file after reaching an end of the at least one of the animation graphics files or the mask graphics file. A series of rows in each of the animation graphics files or the mask graphics file is associated with a temporal flow of a pattern sequence defined by the animation graphics files and the mask graphics file. The method further comprises accessing multiple second binary sequences corresponding to respective mask graphics files, and accessing a configuration file specifying combinations, each combination including at least two of the animation graphics files and one of the mask graphics files. Each of the combinations corresponds to either a stable state or a transition state. The method further comprises regulating change from a first stable state to a second stable state, wherein the configuration file specifies the transition state intermediate the first stable state and the second stable state. The array of electrical components includes light-emitting diodes (LEDs). Transmitting the digital bitstream to control the array of electrical components comprises transmitting the digital bitstream to drivers for respective ones of the LEDs. Transmitting the digital bitstream to the drivers for respective ones of the LEDs comprises transmitting the digital bitstream through a daisy chain of drivers. The method further comprises generating the first binary sequences using the animation graphics files, and generating the second binary sequence using the mask graphics file.

In a sixth aspect, an apparatus comprises: a non-volatile memory storing first binary sequences corresponding to respective animation graphics files, and a second binary sequence corresponding to a mask graphics file; an array of electrical components; and hardware that combines portions of the first binary sequences with each other according to the second binary sequence, to generate a digital bitstream for the array of electrical components.

Implementations can include any or all of the following features. The array of electrical components includes light-emitting diodes (LEDs). Generating the digital bitstream for the array of electrical components comprises transmitting the digital bitstream to drivers for respective ones of the LEDs. Transmitting the digital bitstream to the drivers for respective ones of the LEDs comprises transmitting the digital bitstream through a daisy chain of drivers. The array of electrical components includes electric motors. The array of electrical components includes electric heaters. The array of electrical components includes electric actuators. The hardware comprises: a binary multiplier performing multiplication on at least part of the first binary sequences; and a binary adder performing addition on a product generated by the binary multiplier.

In a seventh aspect, a set of graphics files comprises: a first animation graphics (AG) file comprising first AG pixels, each of the first AG pixels comprising first AG values; a second AG file comprising second AG pixels, each of the second AG pixels comprising second AG values; and a mask graphics (MG) file comprising MG pixels, each of the MG pixels comprising MG values, a first MG value of the MG values specifying a first numerical factor for one of the first AG values, a second MG value of the MG values specifying a second numerical factor for one of the second AG values, the MG pixel defining a sum of (i) the first numerical factor multiplied by the one of the first AG values, and (ii) the second numerical factor multiplied by the one of the second AG values.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
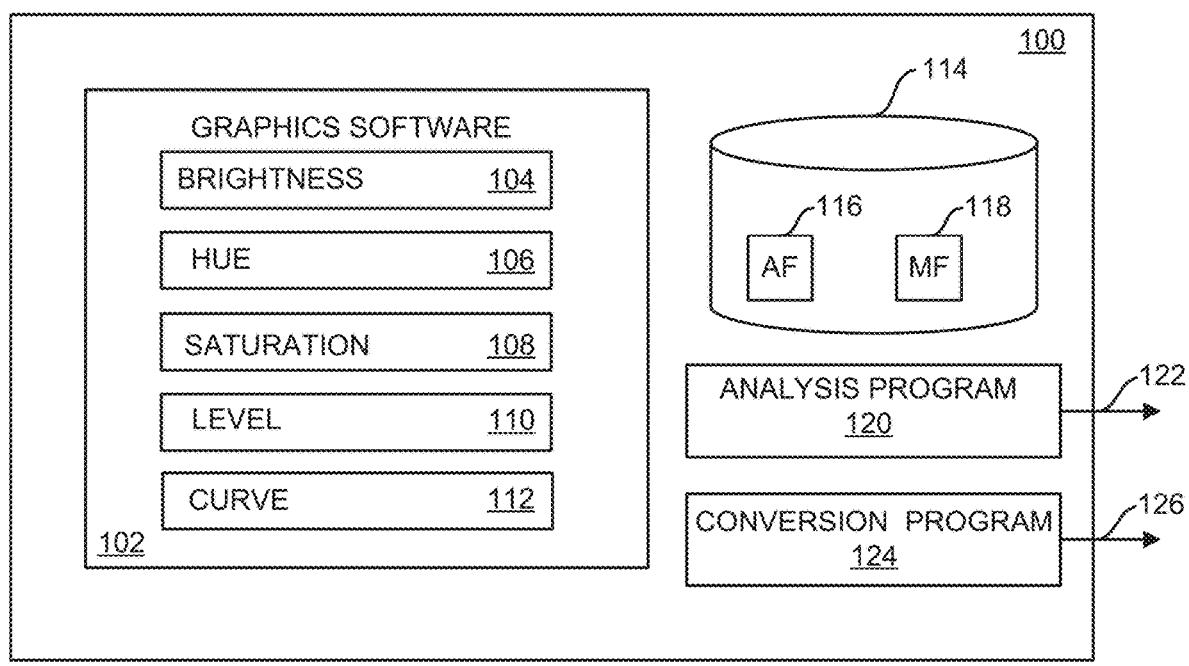
FIG. 1 shows an example of a system that can be used to create graphics files.

The present disclosure describes systems, techniques, and/or articles of manufacture that facilitate improved operation of electrical components. In some implementations, graphics files are used to model and control complex operations of electrical equipment. For example, the graphics files can be used to drive the operation of light-emitting diodes (LEDs) in dynamic patterns while allowing seamless change between patterns at a hardware level, without use of cross-fades. The graphics files can include two or more animation graphics files containing pattern content, and at least one mask graphics file defining combinations of content from the animation graphics files. After the graphics files are created, a program can process the graphics files to determine the electrical demands placed by operating the LEDs according to the graphics files. If an electrical limitation is violated, the graphics files can be modified to comply with the limitation. If the electrical limitation is not violated, there can be output estimated electrical characteristics about LED operation that can be used for monitoring and maintaining the system. A program can convert the graphics files to binary files, and the hardware in the system can use the binary files to combine contents from the animation graphics files and the mask graphics file to drive electrical components (e.g., LEDs) according to defined patterns. A configuration file can specify different combinations of the graphics files for the hardware to use.

Examples herein refer to graphics files. A graphics file can include one or more forms of digital data. The graphics file can be associated with one or more algorithm of image file compression. Compression algorithms can be characterized as lossless (i.e., the algorithm supports lossless data compression and preserves a perfect copy of the uncompressed data) or lossy (i.e., the algorithm supports lossy data compression and does not preserve a perfect copy of the uncompressed data). The digital data can be organized in the form of pixels in the graphics file. Each pixel can be associated with one or more values, sometimes referred to as planes of the graphics file. The graphics file can have any number of planes. In some implementations, a graphics file has three or four planes. For example, three planes can be referred to as respective red, green, and blue planes of the graphics file. For example, transparency can be included as a plane (e.g., a fourth plane) in a graphics file. Each color can be represented using a pixel value having some number of bits (sometimes referred to as color depth). Any color of the graphics file can have any number of bits. In some implementations, a color has an 8-bit depth, corresponding to up to 256 possible color values. In some implementations, a color has a 16-bit depth, corresponding to up to 65,536 possible color values. A graphics file can organize the pixels in the form of an array. For example, the array of pixels in a graphics file can include rows and columns of pixels. Any dimension of a graphics file can be referred to as a length of the graphics file. In some implementations, two or more graphics files can have the same number of pixels in at least one dimension of their respective arrays (e.g., the same number of columns). The respective lengths of the graphics files can refer to the number of rows in each graphics file. For example, a graphics file having a greater number of rows of digital data than another graphics file can be said to be temporally longer than the other graphics file.

Examples herein refer to binary sequences. A binary sequence can include an ordered group of bits, sometimes referred to as binary digits. In some implementations, a binary sequence can include a series of bits represented by respective ones and zeros. The group of bits can be characterized as a binary sequence before it has been persisted in a tangible form and stored. To persist the bits of a binary sequence they can be assembled into the form of a binary file that can be stored in a computer-readable storage medium. For example, a binary file can include bits arranged in groups (e.g., bytes).

Examples herein refer to digital bitstreams. A digital bitstream can be used for communication between a host controller of a system (e.g., a processor of an instrument or other apparatus that contains electrical components) and integrated circuitry that drives the respective electrical components (e.g., a chip that drives one or more LEDs). The digital bitstream can be a logic-level signal transmitted at relatively low currents. For example, the digital bitstream can convey information to the integrated circuitry of the amount of current to use for the electrical components (e.g., to light LEDs). In some implementations, a digital bitstream can be communicated using a clock/data signaling method. For example, one wire connecting the host controller and the integrated circuitry to each other can serve as a data line for sending the digital bitstream to the integrated circuitry. Another wire connecting the host controller and the integrated circuitry to each other can serve as a clock line for sending pulses that trigger the integrated circuitry to record the next digital bit from the digital bitstream on the data line.

Examples herein refer to digital pulses. Digital pulses can be an output of integrated circuitry to drive respective electrical components (e.g., the output of a chip that drives one or more LEDs). The digital pulses can be the result of the integrated circuit(s) interpreting the digital bitstream. That is, the digital bitstream can be transmitted to control an array of electrical components. In some implementations, the digital pulses can dictate how much current goes through LED die. The digital pulses can be a sequence of electric data pulses (e.g., having nominal "on" or "off" values) designed to drive one or more LEDs. In some implementations, each LED includes multiple dies, and respective digital pulses can be provided for the different dies to generate a particular output by the LED. The digital pulses are the electrical power flow that drives one or more LEDs, including, but not limited to, in a strip of LEDs.

Examples herein refer to flags. A flag can be represented by any controllable entity that can be manipulated to either convey or not convey a certain status or other message upon being interpreted. In some implementations, a flag can include one or more bits whose value(s) can indicate a characteristic (e.g., the type of) a particular file. For example, different graphics files can be distinguished from each other by the setting of a flag. As another example, a designated direction of processing in a particular graphics file can be specified using a flag. The flag can be stored in a location that is accessible to a component that is accessing, or that seeks to access, the graphics file. In some implementations, the flag can be stored within the graphics file so that the component can read the flag by accessing the file. In some implementations, the flag can be stored in memory where the component can access the flag before accessing, or while accessing, the graphics file.

Examples herein refer to outputting digital data. Outputting digital data can involve conveying digital data using a tangible medium (e.g., by signals propagating through a physical substrate) and/or using an intangible medium (e.g., by signals propagating in form of electromagnetic radiation). For example, digital data representing one or more files (e.g., graphics files) can be output in form of one or more transmissions from one component to at least one other component. Transmission can include wired and/or wireless communication. Any of multiple protocols can be used for transmitting or otherwise outputting digital data.

Examples herein refer to software or a software system. Software can be designed for one or more computers (e.g., central processing units (CPUs) or a graphics processing unit (GPU)) and can be formulated using any of multiple programming languages, including, but not limited to, a high-level programming language or a machine language. Software can be executed to define one or more applications that can perform specified tasks. Software can include or consist of firmware. In some implementations, firmware can control one or more types of hardware in a system. Firmware and/or other software can be kept by a system (e.g., in non-volatile memory).

Examples herein refer to hardware or a hardware system. Hardware can include one or more types of physical components as the tangible aspects of an apparatus or other system. In some implementations, hardware includes digital electronics that can provide one or more types of operations or other functionality. Digital electronics can include one or more types of circuitry, including, but not limited to, integrated circuits designed to control the operation of electrical components.

Examples herein refer to electrical components. Electrical components operate based on electricity and perform one or more types of operations. An electrical component can operate based on direct current (DC) power and/or alternating current (AC) power. An electrical component can operate to output one or more types of energy. In some implementations, an electrical component outputs electromagnetic radiation. For example, the electrical component can be a source of light (e.g., light in the visible spectrum). The electrical component can include, but is not limited to, a set of light-emitting diodes (LEDs). An electrical component can operate to output one or more forms of mechanical motion. In some implementations, an electrical component includes an electromechanical device. For example, the electrical component can include one or more electric motors (e.g., an induction motor, or a synchronous motor) driven by one or more control signals. As another example, an electrical component can serve to electrically actuate one or more types of mechanical motion. For example, a solenoid or other type of transducer can use an electromagnet to convert electrical and/or magnetic energy into motion (e.g., linear mechanical motion). An electrical component can operate to output thermal energy. In some implementations, the electrical component includes one or more types of electric heater. For example, one or more electric heaters can operate by selectively passing electric current through one or more resistive elements. As another example, an induction heater can operate by penetrating an electrically conducting material with an alternating magnetic field.

FIG. 1 shows an example of a system 100 that can be used to create graphics files. The system 100 can be used with one or more other examples described elsewhere herein. The system 100 can facilitate creation of operational patterns for electrical components. Moreover, the operational pattern can be created also by a person who does not have expertise (e.g., without direct knowledge) of the specifics of the hardware of the electrical components. In some implementations, the system 100 serves such objective(s) by providing a methodology of process design that abstracts the type(s) of hardware involved; that is visually interpretive; and/or that generates an output that is translatable to hardware-specific data for driving one or more types of electrical components. The system 100 can provide the ability for the user (e.g., a graphics designer) to define transitions between two or more operational patterns for the array of electrical components.

In some implementations, the person operating the system 100 is a graphics designer. The graphics designer can use the system 100 to design a pattern to be output by an array of LEDs coupled to an apparatus. For example, complex patterns can be output by the LEDs to indicate one or more current operational statuses of the apparatus (e.g., a stable state), and the pattern(s) can be dynamically modified or switched in real time to indicate a status transition (e.g., a transition state). Here, the system 100 includes graphics software 102. In some implementations, the graphics software 102 is a standard or well-known graphics illustration tool that many graphics designers are familiar with. In some implementations, the graphics software 102 is configured to generate and output graphics files having one or more types of graphics file formats. For example, the graphics software 102 includes tools such as Adobe® Photoshop®, Adobe® Illustrator®, and/or GNU image manipulation program (GIMP), where GNU is the name of an operating system. Other graphics software can be used.

The graphics software 102 can provide one or more functions for use in creating and/or modifying graphics content of graphics files. In some implementations, the graphics software 102 includes a brightness tool 104 that can be used to set and/or modify brightness values of one or more types of graphics files. For example, the brightness tool 104 can manipulate color values for one or more individual pixels in a graphics file. In some implementations, the graphics software 102 includes a hue tool 106 that can be used to set and/or modify hue values of one or more types of graphics files. For example, the hue tool 106 can manipulate hue values for one or more individual pixels in a graphics file. In some implementations, the graphics software 102 includes a saturation tool 108 that can be used to set and/or modify saturation values of one or more types of graphics files. For example, the saturation tool 108 can manipulate light intensity and/or spectrum distribution for one or more individual pixels in a graphics file. In some implementations, the graphics software 102 includes a level tool 110 that can be used to set and/or modify level values of one or more types of graphics files. For example, the level tool 110 can move and/or stretch brightness levels for one or more individual pixels in a graphics file. In some implementations, the graphics software 102 includes a curve tool 112 that can be used to set and/or modify curve values of one or more types of graphics files. For example, the curve tool 112 can adjust one or more points throughout an image's tonal range in a graphics file. Other functions can also or instead be included in the graphics software 102.

The graphics software 102 can generate one or more graphics files 114. In some implementations, one or more of the graphics files 114 can include an animation graphics file (AF) 116. For example, the animation graphics file 116 contains pattern content (e.g., in individual pixel values) for operating an array of electrical components. In some implementations, one or more of the animation graphics files 116 can include a mask graphics file (MF) 118. For example, the mask graphics file 118 defines (e.g., by way of individual pixel values) combinations of content from two or more of the animation graphics files 116 (e.g., by way of scaling one or more pixel values from the animation graphics files 116 and combining the scaled values).

The animation graphics file 116 and the mask graphics file 118 can have one or more file formats. In some implementations, the animation graphics file 116 can include a 3-level or 4-level graphics file type that features 8-bit color depth or 16-bit color depth and supports lossless or lossy image compression. For example, the animation graphics file 116 can be a portable network graphics (PNG) file. As another example, the animation graphics file 116 can be a flexible image transport system (FITS) file. In some implementations, the mask graphics file 118 can include a 3-level or 4-level graphics file type that features 8-bit color depth or 16-bit color depth and supports lossless or lossy image compression. For example, the mask graphics file 118 can be a PNG file. As another example, the mask graphics file 118 can be a FITS file. As such, the animation graphics file(s) 116 and the mask graphics file(s) 118 can have a common graphics file type or can have different graphics file types from each other.

One or more of the animation graphics file 116 and the mask graphics file 118 can be associated with a flag relating to the intended or planned processing of at least the corresponding graphics file. The flag(s) can be included in, or be implemented separate from, the animation graphics file 116 and/or the mask graphics file 118. In some implementations, the flag relates to a difference between types of graphics files. For example, the animation graphics file 116 and the mask graphics file 118 can be distinguished from each other by way of the setting of the flag.

The animation graphics file 116 and/or the mask graphics file 118 can be subjected to analysis before being applied to control operation of the electrical components. Here, the animation graphics file 116 and/or the mask graphics file 118 can be provided to an analysis program 120 in the system 100. The analysis program 120 can be implemented in form of computer-readable instructions stored in a non-transitory medium. In some implementations, the analysis program 120 can evaluate whether the operational characteristics specified by the animation graphics file 116 and the mask graphics file 118 is consistent with one or more applicable electrical thresholds. Such evaluation can involve the analysis program 120 calculating an estimated current for the LEDs (e.g., for each LED color of the LEDs) based on data stored as pixels in the animation graphics file 116 and the mask graphics file 118. For example, an electrical threshold for an array of electrical components can be defined and made accessible to the system 100 (e.g., within the system 100 or elsewhere). The analysis program 120 can evaluate whether presentation of patterns defined by the animation graphics file 116 and the mask graphics file 118 using an array of LEDs is likely to require too great a current for the LEDs or the apparatus controlling the LEDs. For example, the analysis program 120 can perform pixel-by-pixel calculations on combinations of rows from the animation graphics file 116 and the mask graphics file 118 in making such determination.

The analysis program 120 can generate one or more outputs 122. In some implementations, the output can be based on calculating final output currents or control parameter values based on the mask graphics file 118 and multiple instances of the animation graphics file 116. In an example, such a calculation can be represented as:

$$F = A \times M,$$

where F is a vector (e.g., a 3×1 matrix) of the final output currents or control parameter values, A is a matrix (e.g., a 3×3 matrix) of the animation graphics files 116, and M is a vector (e.g., a 3×1 matrix) of the mask graphics file 118. Assume, for example, that each of the LEDs has three dies (referred to as R, G, and B, respectively), which are to be driven using the determined final values. Performing the above calculation of F for each pixel (i.e., a pixel-by-pixel calculation) gives the final output currents or control parameter values that would be applied to the dies in the LED. For example, the values of the result F for the pixel can be $$F = \begin{bmatrix} R_f \\ G_f \\ B_f \end{bmatrix} = \begin{bmatrix} 12 \\ 7 \\ 95 \end{bmatrix}.$$

One or more calculated F values can be evaluated in one or more ways to determine whether at least one predetermined electrical threshold value for the array of electrical components would be exceeded based on the animation graphics files and the mask graphics file. The analysis program 120 can perform such evaluations. In some implementations, the individual values of F can be evaluated (e.g., compared to a predetermined electrical threshold value) to ensure that the current through any individual die is not excessive. For example, the final value F above would be deemed excessive if the predetermined electrical threshold value was lower than 95. If F exceeds the predetermined electrical threshold value, one or more values in the calculation of F can be lowered.

In some implementations, the sum of the values of F can be determined and evaluated (e.g., compared to a predetermined electrical threshold value) to ensure that the current through the given LED package is not excessive. For example, the final value F above would be deemed excessive if the predetermined electrical threshold value was lower than 114, which is the sum of the values. If the sum of values in F exceeds the predetermined electrical threshold value, one or more values in the calculation of F can be lowered.

In some implementations, the sum of all the values in all the F's for the entire array of electrical components (e.g., for all LEDs in the string) can be determined and evaluated (e.g., compared to a predetermined electrical threshold value) to ensure that the current through the given array of electrical components is not excessive. If the sum of values of all F's exceeds the predetermined electrical threshold value, one or more values in the calculation of one or more of the F's can be lowered.

In some implementations, the output 122 indicates that the outcome of the pixel-by-pixel calculations complies with (e.g., does not exceed) the electrical threshold for the array of electrical components. For example, the output 122 can reflect that the calculated final value F above does not exceed the electrical threshold. In some implementations, the output 122 can include a calculated electrical value describing the array of electrical components. Any of multiple different calculated electrical values can be output. In some implementations, the calculated electrical value comprises an average total current for all row combinations of the animation graphics files and the mask graphics file. In some implementations, the calculated electrical value comprises a highest total current (e.g., an upper current limit) among all row combinations of the animation graphics files and the mask graphics file. In some implementations, the array of electrical components includes LEDs, and the calculated electrical value comprises a current for each LED color of the LEDs. For example, the current for each LED color of the LEDs is at least one of an average or a maximum current. In some implementations, the calculated electrical value comprises a current for each LED of the LEDs. For example, the current for each LED of the LEDs is at least one of an average or a maximum current.

Use of the analysis program 120 exemplifies performance of a method that includes accessing a first animation graphics file and a second animation graphics file (e.g., the animation graphics file 116) and a mask graphics file (e.g., the mask graphics file 118), and a predetermined electrical threshold value for an array of electrical components (e.g., the electrical threshold value of 100 of the above example); performing pixel-by-pixel calculations (e.g., by the analysis program 120) on combinations of rows from the first animation graphics file, and the second animation graphics file and the mask graphics file, each of the pixel-by-pixel calculations including determining a first scaled pixel value by multiplying a first animation pixel value from the first animation graphics file with a first mask pixel value from the mask graphics file, determining a second scaled pixel value by multiplying a second animation pixel value from the second animation graphics file with a second mask pixel value from the mask graphics file, and determining a sum of the first scaled pixel value and the second scaled pixel value; and generating an output (e.g., the output 122) that reflects whether an outcome of the pixel-by-pixel calculations (e.g., the calculated result F exceeds the predetermined electrical threshold value for the array of electrical components. The method can be performed by way of executing instructions of a computer program product stored in a non-transitory medium (e.g., the analysis program 120).

The animation graphics file 116 and/or the mask graphics file 118 can be subjected to conversion to be applied to control operation of the electrical components. Here, the animation graphics file 116 and/or the mask graphics file 118 can be provided to a conversion program 124 in the system 100. The conversion program 124 can be implemented in form of computer-readable instructions stored in a non-transitory medium. In some implementations, the conversion program 124 can generate an output 126 using the animation graphics file 116 and the mask graphics file 118. In some implementations, the output 126 includes respective first binary sequences corresponding to the animation graphics files 116, and a second binary sequence corresponding to the mask graphics file 118. Each of the first binary sequences can be generated by converting a corresponding one of the animation graphics files 116 to binary form. In some implementations, each of the animation graphics files 116 and the mask graphics file 118 includes values in hexadecimal form. For example, each first binary sequence can include the pixel values of one of the animation graphics files 116 represented in binary form. The second binary sequence can be generated by converting the mask graphics file 118 to binary form. For example, the second binary sequence can include the pixel values of the mask graphics file 118 represented in binary form. The first binary sequences and the second binary sequence can be included in one or more binary files of the output 126.

Use of the conversion program 124 exemplifies performance of a method that includes accessing animation graphics files (e.g., the animation graphics files 116) and a mask graphics file (e.g., the mask graphics file 118); generating first binary sequences corresponding to the animation graphics files, and generating a second binary sequence corresponding to the mask graphics file; and outputting the first binary sequences and the second binary sequence (e.g., collectively as the output 126) to hardware controlling an array of electrical components. The method can be performed by way of executing instructions of a computer program product stored in a non-transitory medium (e.g., the conversion program 124).

Figure 2:
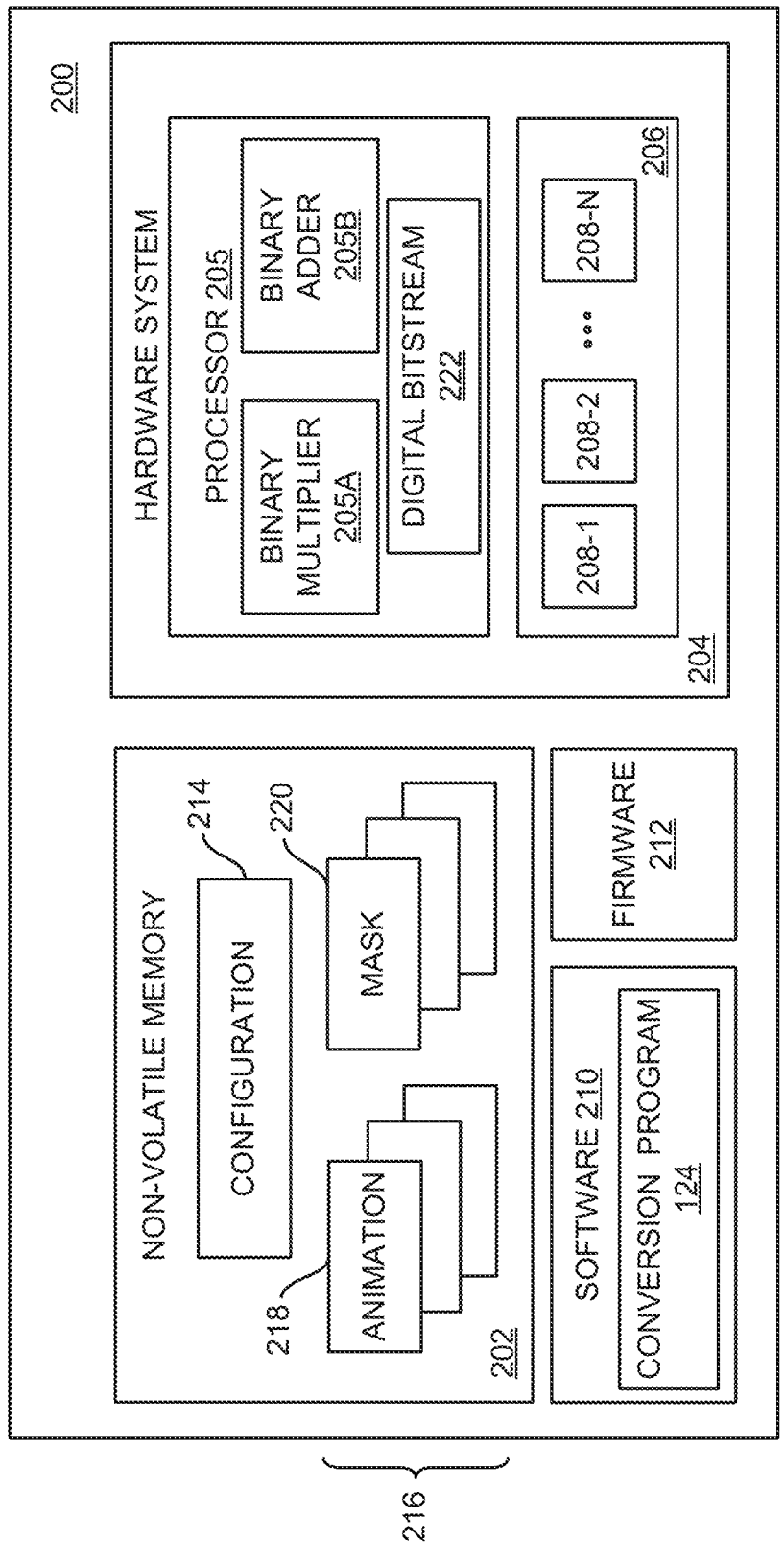
FIG. 2 shows an example of a system that can use graphics files to control operation of an array of electrical components.

FIG. 2 shows an example of a system 200 that can use graphics files to control operation of an array of electrical components. The system 200 can be used with one or more other examples described elsewhere herein. The system 200 includes non-volatile memory 202 (e.g., flash memory, magnetic storage medium, and/or optical storage medium) and a hardware system 204. The hardware system 204 includes a processor 205 (e.g., the processing device 1302 in FIG. 13, including, but not limited to, CPU or GPU), an array 206 of electric components 208-1, 208-2, . . . 208-N, where N is a positive integer greater than or equal to two. The processor 205 can include a binary multiplier 205A and a binary adder 205B.

The system 200 includes a software system 210. The software system 210 can be operated based on data stored in the non-volatile memory 202 and be implemented for operation by way of processor-based execution of instructions (e.g., by the processor 205). The system 200 includes a firmware system 212. The firmware system 212 can be operated based on data stored in the non-volatile memory 202 and be implemented by way of processor-based execution of instructions (e.g., by the processor 205).

The role of the software system 210 can be to notify the firmware system 212 when the state of the system 200 (e.g., an apparatus) changes. Any of multiple different states can be defined. For example, when the system 200 includes an apparatus configured for analyzing nucleic materials (e.g., the system 200 is a sequencer) the states of the system 200 can include, but are not limited to, an idle state (e.g., the system 200 is not currently analyzing nucleic materials); a pre-run state (e.g., the system 200 is currently preparing itself for analyzing nucleic materials); a sequencing state (e.g., the system 200 is currently analyzing nucleic materials); or a complete state (e.g., the system 200 has finished analyzing nucleic materials but has not (yet) entered the idle state). Each state of the system 200 can have associated with it a predefined pattern to be presented using an array of LEDs. For example, the pattern can include a looping combination of animation graphics files and a mask graphics file (e.g., the animation graphics files 116 and the mask graphics file 118 of FIG. 1). One or more states can be considered a stable state and one or more states can be considered a transition state. A stable state can be repeated until a state change occurs. For example, a stable state can have one or more transition states defined to be sequentially and/or repeatedly presented on the array of LEDs before presentation of the pattern of the stable state, which can be looped (e.g., indefinitely, until the software system 210 instructs to change the state). The transition state can be repeated for one or more iterations. A configuration file 214 can define the applicable patterns. In some implementations, the configuration file 214 is stored in the non-volatile memory 202 and specifies the pattern(s) applicable for one or more states of the system 200. The software system 210 can regulate change from a first stable state (e.g., pre-run) to a second stable state (e.g., sequencing), and the configuration file 214 can specify the transition state intermediate the first stable state and the second stable state (e.g., specifying the transition pattern that should be presented after the pre-run pattern and before the sequencing pattern).

The software system 210 can include one or more additional functionalities. In some implementations, the software system 210 includes the conversion program 124. Implementing the conversion program 124 within the software system 210 can ensure an ability by the system 200 to convert one or more of the animation graphics files 218 and one or more of the mask graphics files 220 for use in controlling the array 206 of electric components.

The system 200 can access one or more binary files 216. In some implementations, the binary file(s) 216 can be the output of the conversion program 124 in FIG. 1 (e.g., the output 126). The binary files 216 can include one or more binary sequences that correspond to respective graphics files. Here, animation graphics files 218 and mask graphics files 220 are shown. That is, the binary files 216 illustrate that outputting first binary sequences and a second binary sequence by the conversion program 124 in FIG. 1 can include transmitting a binary file including the first binary sequences and the second binary sequence. In some implementations, each combination defined by the configuration file 214 includes at least two of the animation graphics files 218 and one of the mask graphics files 220.

The role of the firmware system 212 can be to access state change notifications from the software system 210 and prepare the hardware system 204 with the information needed to transmit a digital bitstream to control the array 206 of electrical components. For example, the digital bitstream can be transmitted to drivers for the LEDs, and the drivers can generate digital pulses for the LEDs based on the digital bitstream. In some implementations, the firmware system 212 can read the required combinations of the binary files 216 as defined by the configuration file 214, coordinate the loading of at least some of the binary files 216 (e.g., into the non-volatile memory 202 from the conversion program 124 in FIG. 1), and notify the hardware system 204 where to find the relevant binary files 216. The role of the hardware system 204, moreover, can be to combine the binary files 216 in the non-volatile memory 202 based on pixel values in one or more of the mask graphics files 220, and build and transmit a digital bitstream to the array 206 of the LEDs 208-1, 208-2, . . . 208-N. In some implementations, the processor 205 includes a digital bitstream component 222 that performs combinations of at least some of the binary files 216 and builds a digital bitstream for the array 206. In some implementations, the digital bitstream component 222 accesses (e.g., receives) the results of multiplications performed by the binary multiplier 205A and additions performed by the binary adder 205B, and generates the digital bitstream based on those results. For example, the pattern information for one presentation by the LEDs 208-1, 208-2, . . . 208-N can be considered a frame in a pattern sequence, the sequence being performed by successive transmission of multiple frames of digital bits to the LED drivers. Any rate of frame presentation can be used. In some implementations, the digital bitstream component 222 can provide for operation at multiple frames per second, including, but not limited to, at tens of frames per second (such as about 30 frames per second).

As a numerical example, consider a situation that involves first, second, and third animation graphics files and one mask file. Moreover, assume that one pixel in the first animation graphics file has the values (12, 25, 8), that one pixel in the second animation graphics file has the values (42, 0, 61), that one pixel in the third animation graphics file has the values (4, 50, 29), and that the mask graphics file has the values (90, 99, 33). In some implementations, a divisor can be used as a normalization factor (e.g., the number 255 in an 8-bit implementation), in either the mask graphics file or in all of the animation graphics files, but the normalization factor is omitted in this example for simplicity. Converting the above pixel values to binary yields the following binary files:

(0001100, 0011001, 0001000) as the binary file for the pixel of the first animation graphics file;
(0101010, 0000000, 0111101) as the binary file for the pixel of the second animation graphics file;
(0000100, 0110010, 0011101) as the binary file for the pixel of the third animation graphics file; and
(1011010, 1100011, 0100001) as the binary file for the pixel of the mask graphics file.

The digital bitstream component 222 can include a binary multiplier and a binary adder. The digital bitstream component 222 can use the binary multiplier for multiplying the first value for the first animation graphics file with the first value for the mask graphics file; multiplying the first value for the second animation graphics file with the second value for the mask graphics file; and multiplying the first value for the third animation graphics file with the third value for the mask graphics file. These multiplications generate multiple products (here, three products). The digital bitstream component 222 can use the binary adder to sum up these products to a single value that is the control parameter for the first die of the LED (e.g., the control parameter for the red die of the LED). The digital bitstream component 222 can use the binary multiplier to perform new multiplications regarding the second values of the three animation graphics files with the values of the mask graphics file, and use the binary adder to sum up these products to a single value that is the control parameter for the second die of the LED (e.g., the control parameter for the green die of the LED). The digital bitstream component 222 can use the binary multiplier to perform new multiplications regarding the third values of the three animation graphics files with the values of the mask graphics file, and use the binary adder to sum up these products to a single value that is the control parameter for the third die of the LED (e.g., the control parameter for the blue die of the LED).

The system 200 illustrates an example of an apparatus including a non-volatile memory (e.g., the non-volatile memory 202) storing first binary sequences (e.g., the binary files 216) corresponding to respective animation graphics files (e.g., the animation graphics files 218), and a second binary sequence (e.g., the binary files 216) corresponding to a mask graphics file (e.g., one of the mask graphics files 220); an array (e.g., the array 206) of electrical components (e.g., the LEDs 208-1, 208-2, . . . 208-N); and hardware (e.g., the hardware system 204) that combines (e.g., by the digital bitstream component 222) portions of the first binary sequences with each other according to the second binary sequence, to generate a digital bitstream for the array of electrical components.

Use of the system 200 illustrates an example of performance of a method that includes accessing first binary sequences (e.g., the binary files 216) corresponding to animation graphics files (e.g., the animation graphics files 218), and a second binary sequence (e.g., the binary files 216) corresponding to a mask graphics file (e.g., one of the mask graphics files 220); combining portions of the first binary sequences with each other according to the second binary sequence, to generate a digital bitstream; and transmitting (e.g., by the digital bitstream component 222) the digital bitstream to an array (e.g., the array 206) of electrical components (e.g., the LEDs 208-1, 208-2, . . . 208-N).

Figure 3:
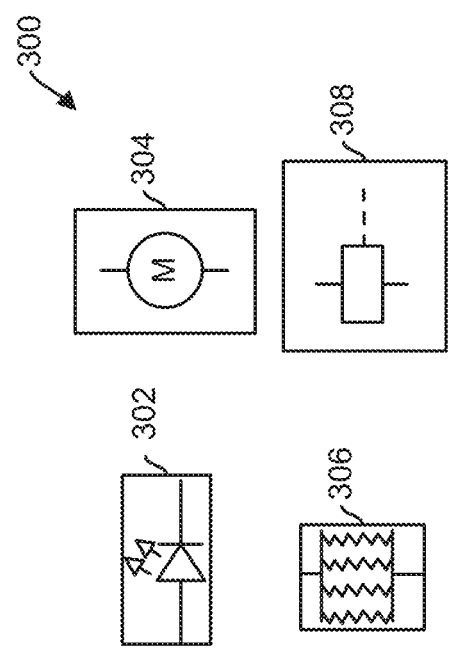
FIG. 3 schematically shows examples of electrical components.

FIG. 3 schematically shows examples of electrical components 300. The electrical components 300 can be used with one or more other examples described elsewhere herein. Some of the electrical components 300 can be implemented as part of, instead of, or in addition to the LEDs 208-1, 208-2, . . . 208-N in FIG. 2. That is, the array 206 in FIG. 2 can instead, or additionally, include some or all of the electrical components 300.

An electrical component 302 corresponds to an LED. In some implementations, the LED includes one or more dies configured to generate light upon receiving electric power. For example, each die can include at least one p-n-junction where light is generated by the recombination of electrons and electron holes with each other. In some implementations, the LED includes multiple dies of different colors. For example, the LED can include respective red, green, and blue dies. Each of the LEDs can a have a number of control pins for receiving electric power to control its operation. An array of the electrical component 302 can be arranged to output complex patterns of multicolor light that can undergo pattern changes without discontinuity or dimming of LEDs.

An electrical component 304 corresponds to an electric motor. In some implementations, the electric motor converts supplied electric energy to mechanical motion (e.g., by rotating a mechanical shaft or other axis (e.g., on a pump, fan, elevator, or vehicle). For example, the electric motor can include a rotor controlled to operate by a stator. An array of the electrical component 304 can be arranged to perform complex patterns of motion and undergo pattern changes (e.g., between respective stable and transition states).

An electrical component 306 corresponds to an electric heater. In some implementations, the electric heater can perform thermal control of one or more physical locations. For example, the heating pattern can support a process at a manufacturing plant, diurnal thermal zones at a storage facility, or a use-based heating pattern at a residential complex.

An electrical component 308 corresponds to an electric actuator. In some implementations, one or more electric actuators uses electromagnetic force to actuate one or more physical objects (e.g., a lever, pump, or tool) to perform a complex pattern of mechanical operations.

Figure 4:
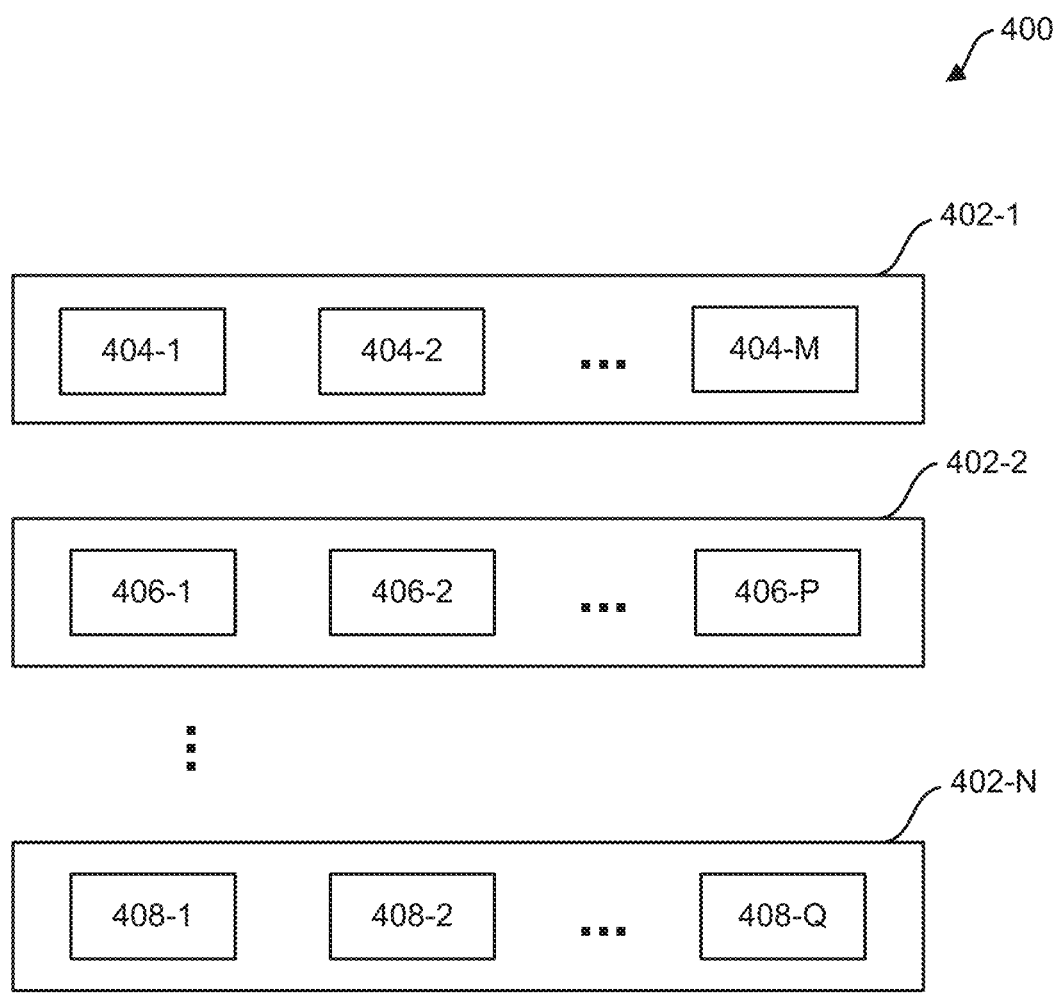
FIG. 4 schematically shows an example of an array of electrical components.

FIG. 4 schematically shows an example of an array 400 of electrical components. The array 400 can be used with one or more other examples described elsewhere herein. The array 400 can be organized in multiple sub-arrays. Here, sub-arrays 402-1, 402-2, . . . , 402-N are shown, where N is an integer greater than or equal to two. Each of the sub-arrays 402-1, 402-2, . . . , 402-N can include one or more electrical components. Here, electrical components 404-1, 404-2, . . . , 404-M are shown in the sub-array 402-1, where M is an integer greater than or equal to two. Here, electrical components 406-1, 406-2, . . . , 406-P are shown in the sub-array 402-2, where P is an integer greater than or equal to two. Here, electrical components 408-1, 408-2, . . . , 408-Q are shown in the sub-array 402-N, where Q is an integer greater than or equal to two. As such, each of the N sub-arrays 402-1, 402-2, . . . , 402-N can have the same number, or a different number, of electric components than another sub-array. Multiple electrical components according to one or more of the types of electrical components in FIG. 3 can be arranged according to the array 400.

Figure 5:
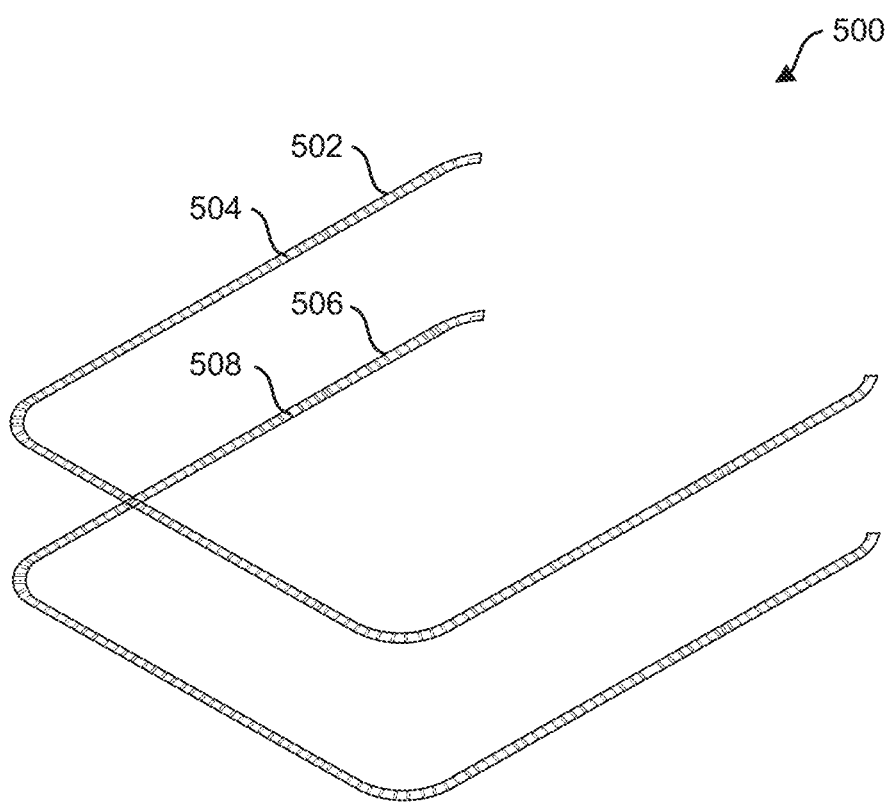
FIG. 5 shows an example of an array of light-emitting diodes (LEDs).

FIG. 5 shows an example of an array 500 of LEDs. The array 500 can be used with one or more other examples described elsewhere herein. The array 500 includes an LED strip 502 that includes a circuit board having a series of LEDs 504 mounted thereon. The array 500 includes an LED strip 506 that includes a circuit board having a series of LEDs 508 mounted thereon. The LED strips 502 and 506 can be identical to each other or different from each other (e.g., having different numbers of, and/or arrangements of, LEDs). In some implementations, the LED strips 502 and 506 can be mounted at different sides of a lightguide or a diffuser (e.g., at opposing ends thereof) so as to generate visual patterns on the lightguide or a diffuser when activated according to one or more patterns defined by graphics files. The lightguide and/or diffuser can have any shape, including, as shown, a U-shape. Other shapes can be used. In some implementations, the LED strip 502 can be considered an upper LED strip and the LED strip 506 can be considered a lower LED strip in such an implementation.

Figure 6:
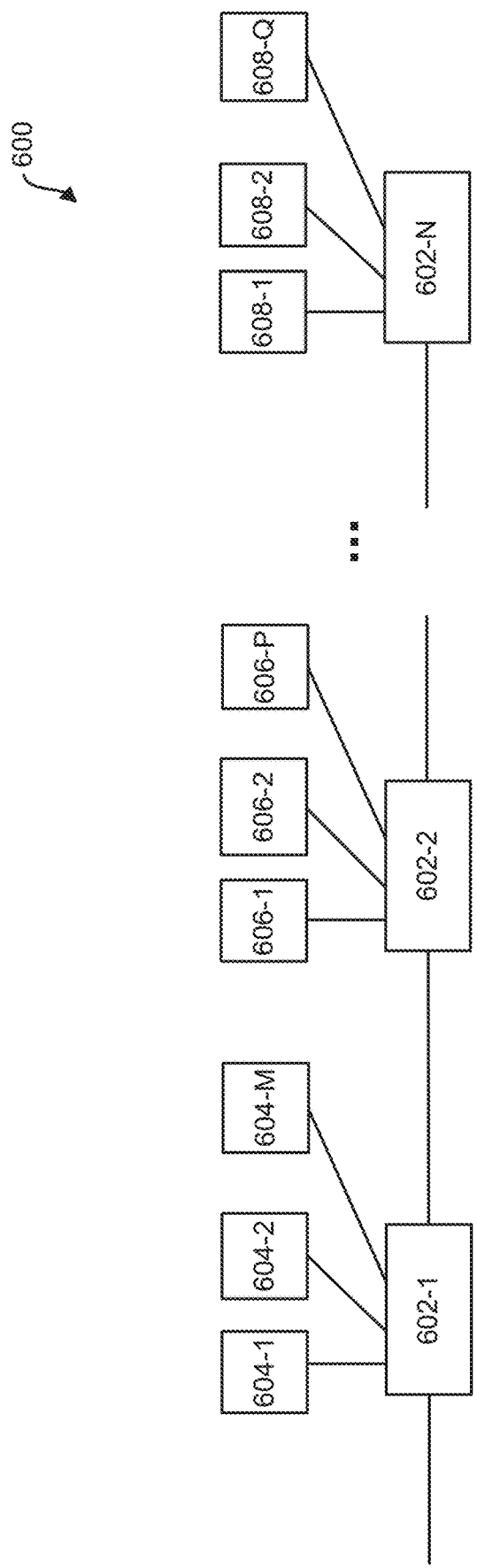
FIG. 6 schematically shows an example of a daisy chain of drivers for LEDs.

FIG. 6 schematically shows an example of a daisy chain 600 of drivers for LEDs. The daisy chain 600 can be used with one or more other examples described elsewhere herein. The daisy chain 600 can include multiple drivers. Here, drivers 602-1, 602-2, . . . , 602-N are shown, where N is an integer greater than or equal to two. Each of the drivers 602-1, 602-2, . . . , 602-N can be associated with one or more LEDs. Here, LEDs 604-1, 604-2, . . . , 604-M are driven by the driver 602-1, where M is an integer greater than or equal to two. Here, LEDs 606-1, 606-2, . . . , 606-P are driven by the driver 602-2, where P is an integer greater than or equal to two. Here, LEDs 608-1, 608-2, . . . , 608-Q are driven by the driver 602-N where Q is an integer greater than or equal to two. As such, each of the N drivers 602-1, 602-2, . . . , 602-N can have the same number, or a different number, of LEDs than another driver. Multiple electrical components according to one or more of the types of electrical components in FIG. 3 can be arranged according to the daisy chain 600. As another example, the digital bitstream component 222 (FIG. 2) can transmit a digital bitstream to the drivers 602-1, 602-2, . . . , 602-N, each of which can generate respective digital pulses to cause the LEDs of the daisy chain 600 to present complex patterns and/or pattern changes.

In some implementations, standard graphics files (including, but not limited to, PNG and/or FITS files) can be used to represent an array of electrical components (e.g., LEDs) and the patterns of operation of such electrical components (e.g., animated patterns to be presented by the LEDs). Use of such or other standard graphics file formats can allow standard graphics software (e.g., the graphics software 102 in FIG. 1) to be used in generating the binaries to control complex and dynamically altering operational patterns of electrical components.

Figure 7:
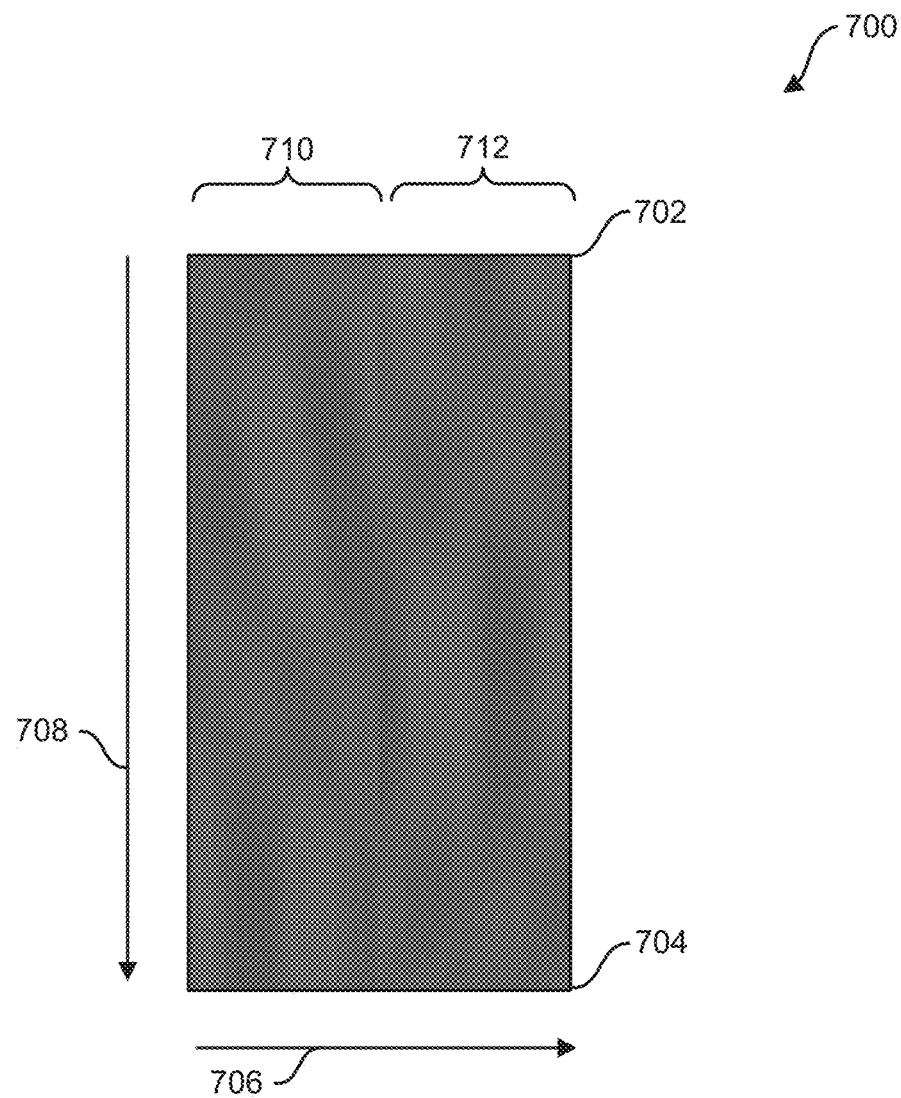
FIG. 7 shows an example of an animation graphics file.

FIG. 7 shows an example of an animation graphics file 700. The coloring of FIG. 7 is important to distinguish the gradients of values represented by the different colors over the three different red, green, and blue values and combinations thereof. The animation graphics file 700 can be used with one or more other examples described elsewhere herein. The animation graphics file 700 includes pixels (e.g., multicolor value sets) arranged in sets of rows and columns. The animation graphics file 700 includes a first row 702 and a last row 704. The order in which rows are processed can be changed, so the terms first and last are here used for illustrative purposes only. A dimension 706, schematically illustrated as an arrow, here extends parallel to the rows of the animation graphics file 700. In some implementations, each pixel in the component dimension 706 corresponds to a corresponding individual electrical component. For example, each of the pixels in the first row 702 can be associated with a respective LED in an array, and so on. A temporal dimension 708, schematically illustrated as an arrow, here extends parallel to the columns of the animation graphics file 700. The temporal dimension 708 can be associated with a temporal flow of a pattern sequence defined by the animation graphics files and the mask graphics file. As such, a series of rows in the animation graphics file 700 can be associated with a temporal flow of a pattern sequence defined by the animation graphics files and a mask graphics file. That is, each pixel in a column of the animation graphics file 700 can be associated with a respective electrical component of the array of electrical components arranged temporally along temporal dimension 708, and each row can (in combination with a mask graphics file and one or more other animation graphics files) be associated with a frame in a pattern sequence.

Patterns regarding two or more sub-arrays of electrical components can be included in the animation graphics file 700. In some implementations, a region 710 (e.g., the leftmost half of the columns) can be associated with a first sub-array of electrical components, and a region 712 (e.g., the rightmost half of the columns) can be associated with a second sub-array of electrical components. The first sub-array of electrical components can correspond to a first set of LEDs (e.g., the LEDs 504 of the LED strip 502 in FIG. 5). The second sub-array of electrical components can correspond to a second set of LEDs (e.g., the LEDs 508 of the LED strip 506 in FIG. 5). Any type of pattern can be generated by setting the values of the animation graphics file 700 accordingly. For example, in the current example, the LEDs would present a wavering pattern of blue colors, purple colors, and orange colors across an entire span (e.g., width) of an array of LEDs.

Figure 8:
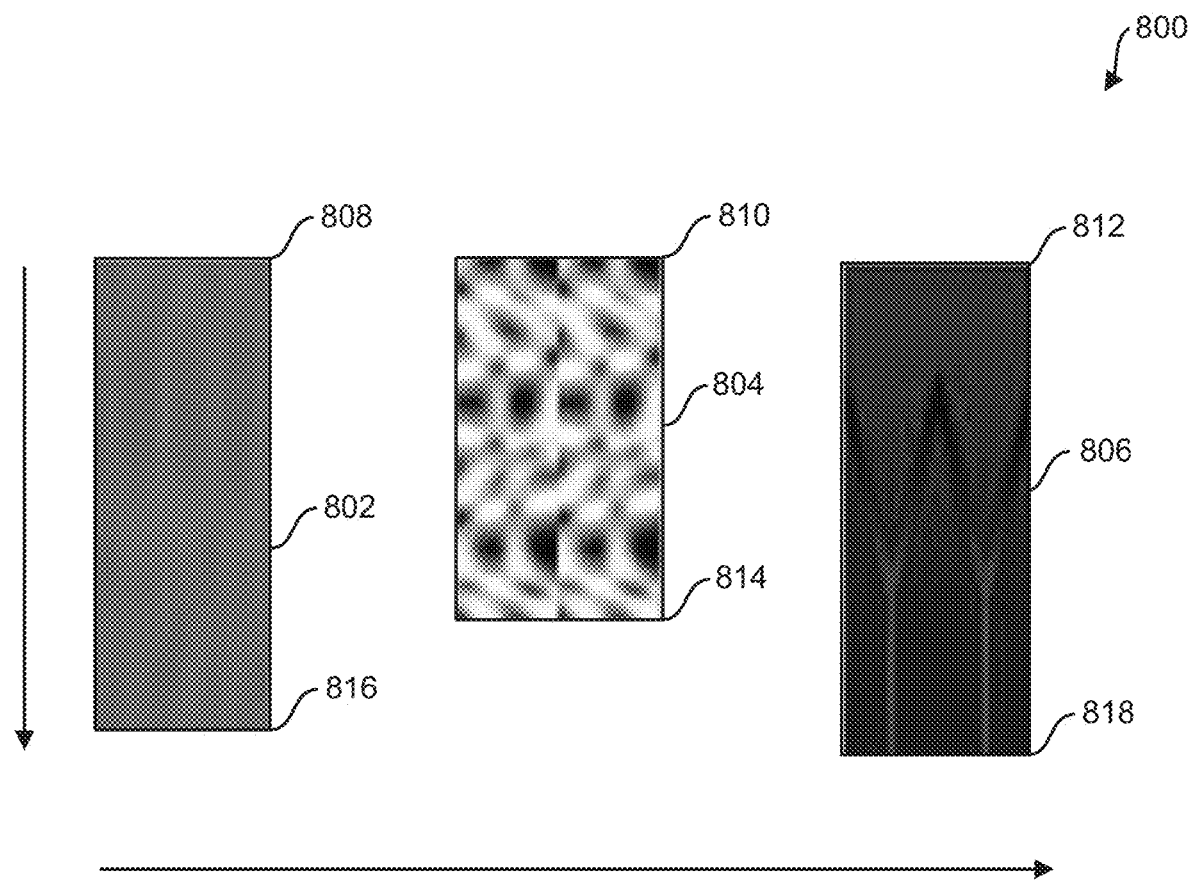
FIG. 8 shows an example of graphics files including animation graphics files and a mask graphics file.

FIG. 8 shows an example of graphics files 800 including animation graphics files 802 and 804 and a mask graphics file 806. The coloring of FIG. 8 for animation graphics file 802 and mask graphics file 806 is important to distinguish the gradients of values represented by the different colors over the three different red, green, and blue values and combinations thereof. The animation graphics files 802 and 804 and/or the mask graphics file 806 can be used with one or more other examples described elsewhere herein. A set of graphics files can be used to cause hardware to present complex animated patterns, and also or instead to implement dynamic effects such as motion, picture-in-picture, brightening, fading, mixing, and transitioning of patterns.

The animation graphics files 802 and 804 will be scaled and combined using the mask graphics file 806 in what is here referred to as pixel-by-pixel calculations. For example, the analysis program 120 (FIG. 1) can perform the pixel-by-pixel calculations. Each of the graphics files 800 can be looped through independently of the others in the pixel-by-pixel calculations. In some implementations, pixels in the rows of each of the graphics files 800 correspond to individual electrical components, and the respective rows of the graphics files 800 correspond to the passage of time during performance of a pattern. The hardware can constantly loop through all of the graphics files 800 (e.g., at a constant rate) in the pixel-by-pixel calculations. One or more of the graphics files 800 can have a different temporal length than another graphics file. As such, the processing of one of the graphics files 800 can start over (e.g., begin another loop) when reaching the end of that graphics file. For example, the processing in the pixel-by-pixel calculations can begin with a first row 808 of the animation graphics file 802, and with a first row 810 of the animation graphics file 804, and with a first row 812 of the mask graphics file 806. Each pixel-by-pixel calculation can involve scaling (e.g., multiplying) pixel values from the animation graphics files 802 and 804 with values from the mask graphics file 806, and summing the scaled pixel values. The pixel-by-pixel calculations can be performed in order for each of the pixels in the respective row of the graphics files 800. After the pixel-by-pixel calculations for one row are complete, the processing can continue with a next row in each of the graphics files 800. When reaching a final row 814 of the animation graphics file 804 in the pixel-by-pixel calculations, the processing can loop to the first row 810 of the animation graphics file 804 and continue with subsequent rows of the animation graphics file 802 and the mask graphics file 806. When reaching a final row 816 of the animation graphics file 802 in the pixel-by-pixel calculations, the processing can loop to the first row 808 of the animation graphics file 802 and continue with subsequent rows of the animation graphics file 804 and the mask graphics file 806. When reaching a final row 818 of the mask graphics file 806, the processing can loop to the first row 812 of the mask graphics file 806 and continue with subsequent rows of the animation graphics files 802 and 804. As such, the pixel-by-pixel calculations can be performed in multiple iterations of processing. One or more of the graphics files 800, such as the mask graphics file 806, can have associated with it a flag regarding the direction of processing. For example, with one setting of the flag, such as a bit value of 0, the mask graphics file 806 can be processed in a direction from the first row 812 toward the final row 818. As another example, with another setting of the flag, such as a bit value of 1, the mask graphics file 806 can be processed in a direction from the final row 818 toward the first row 812. As such, the terms first and final used herein are for illustrative purposes only and do not necessarily indicate the processing direction. That is, generating a binary sequence (e.g., in the form of a binary file) can include reading a flag that indicates processing direction.

The pixel-by-pixel calculations can be performed by the analysis program 120 on the animation graphics files 116 and the mask graphics file 118 (FIG. 1) to evaluate whether the operation control parameters would result in the electrical components exceeding a predetermined electrical threshold. In some implementations, each pixel in the graphics files 800 contains three values, one each for red, green, and blue. An LED, moreover, can include three color dies, one each for red, green, and blue. The three values in each of the animation graphics files 802 and 804 can control the amount of current that is provided to drive the three color dies in the corresponding LED. The three values of any given pixel in the mask graphics file 806 can be used for scaling the values in the corresponding pixels of the animation graphics files 802 and 804 before adding them together to derive the final values sent to the LED color dies.

In an example where three animation graphics files are used, three animation pixels can be scaled and combined as defined by one mask pixel. Assume that the animation pixels from the respective animation graphics files are distinguished from each other using the subscripts a, b, and c, respectively. The mask pixel, on the other hand, uses the subscript m. Moreover, the red, green, and blue values of each of the pixels are referred to using the capital letters R, G, and B, respectively. The following relationship illustrates the pixel-by-pixel calculations that can be performed to calculate final graphics values denoted by the subscript f:

$$\begin{bmatrix} R_f \\ G_f \\ B_f \end{bmatrix} = \begin{bmatrix} R_a & R_b & R_c \\ G_a & G_b & G_c \\ B_a & B_b & B_c \end{bmatrix} \begin{bmatrix} G_m/X \\ R_m/X \\ B_m/X \end{bmatrix}.$$

That is, an array for the mask graphics file (e.g., a 3×1 array) can be multiplied by an array for the animation graphics files (e.g., a 3×3 array), to obtain an array of the final pixel values (e.g., a 3×1 array). Here, X is a normalization factor that can be used to keep final values within an allowable range. That is, the green value in the mask pixel is used to scale the entire pixel in the animation graphics file a; the red value in the mask pixel is used to scale the entire pixel in the animation graphics file b; and the blue value in the mask pixel is used to scale the entire pixel in the animation graphics file c.

Stated more generally, two or more animation graphics files having a number of values per pixel can be combined using a corresponding mask graphics file. The following example involves P number of animation graphics files and a mask graphics file where each pixel has P color values, where P is a positive integer greater than or equal to two. Moreover, each pixel includes N color values, where N is a positive integer greater than or equal to two. Thus, $A_{1N}$ refers to the Nth color value of the pixel in the first animation graphics file, and $A_{P1}$ refers to the first color value of the pixel in the Pth animation graphics file. The following relationship illustrates the pixel-by-pixel calculations that can be performed to calculate final graphics values denoted by the capital letter F:

$$\begin{bmatrix} F_1 \\ F_2 \\ \vdots \\ F_N \end{bmatrix} = \begin{bmatrix} A_{11} & A_{21} & \cdots & A_{P1} \\ A_{12} & A_{22} & & A_{P2} \\ \vdots & \vdots & \ddots & \\ A_{1N} & A_{2N} & & A_{PN} \end{bmatrix} \begin{bmatrix} M_1/X \\ M_2/X \\ \vdots \\ M_P/X \end{bmatrix}.$$

Returning to the example involving the graphics files 800, the animation graphics file 802 is here an animation loop of wavering blue colors and purple colors, the animation graphics file 804 is here an animation loop of wavering white shades and black shades, and the mask graphics file 806 is a mask file defining the mix of the animation graphics files 802 and 804. Here, the bright red color across the top 20% portion of the mask graphics file 806 indicates that pixels from the animation graphics file 804 are being presented at the array of LEDs at a relatively high scale factor. That is, the final output currents or control parameter values to control a corresponding LED are sums of a scaled pixel value from the animation graphics file 802 and a scaled pixel value from the animation graphics file 804. The intermediate 20% to 80% section of the mask graphics file 806 here indicates that three effects are taking place. First, the red color is gradually darkening (e.g., due to a gradual decrease in the value of the red value in the pixels of the mask graphics file 806), resulting in the brightness of the pixels from the animation graphics file 804 being gradually reduced over that period of time. Second, there is shape of green pixels being introduced in the mask graphics file, indicating that a stripe of pixels from the animation graphics file 802 are being presented, starting from the LEDs at the rear corners of two LED strips (e.g., the LED strips 502 and 506 in FIG. 5), and moving over time to the center of the two LED strips. Third, the intensity of the green pixels in the mask graphics file 806 is gradually increasing, resulting in the brightness of the pixels from the animation graphics file 802 gradually increasing over that period of time. Finally, for the bottom 20% of the mask graphics file 806, the relatively dark red color and bright green color results in dim pixels from the animation graphics file 804 being presented on most of the LEDs of the LED strips, with a strip of bright pixels from the animation graphics file 802 being presented on the LEDs in the middle of the LED strips.

During the entire period of working through the mask graphics file 806, the animation graphics files 802 and 804 are continuously looping, so that the wavering patterns of color from each of the animation graphics files 802 and 804 are being applied to the LEDs of the LED strips, albeit at the brightness and locations dictated by the mask graphics file 806.

If a third animation graphics file has been used with the graphics files 800, its contributions to color, brightness, and location can be determined by blue colors in the mask graphics file 806. That is, if one or more animation graphics files is not being used, the corresponding color value in the mask graphics file 806 can be set to zero.

In some implementations, all possible combinations of rows between the graphics files 800 can be processed in the pixel-by-pixel calculations by the analysis program 120 on the animation graphics files 116 and the mask graphics file 118 (FIG. 1) to evaluate whether the operation control parameters would result in the electrical components exceeding a predetermined electrical threshold. For example, the processing can begin with pixel-by-pixel calculations based on the first row 808, the first row 810, and the first row 812, and the processing can continue in iterations of different row combinations, with looping occurring at ends of files. When the processing again reaches the row combination of the first row 808, the first row 810, and the first row 812, the processing can terminate, as this combination had already been calculated. As such, performing pixel-by-pixel calculations can include performing pixel-by-pixel calculations on all possible combinations of rows from the animation graphics files 802 and 804 and the mask graphics file 806.

Figure 9:
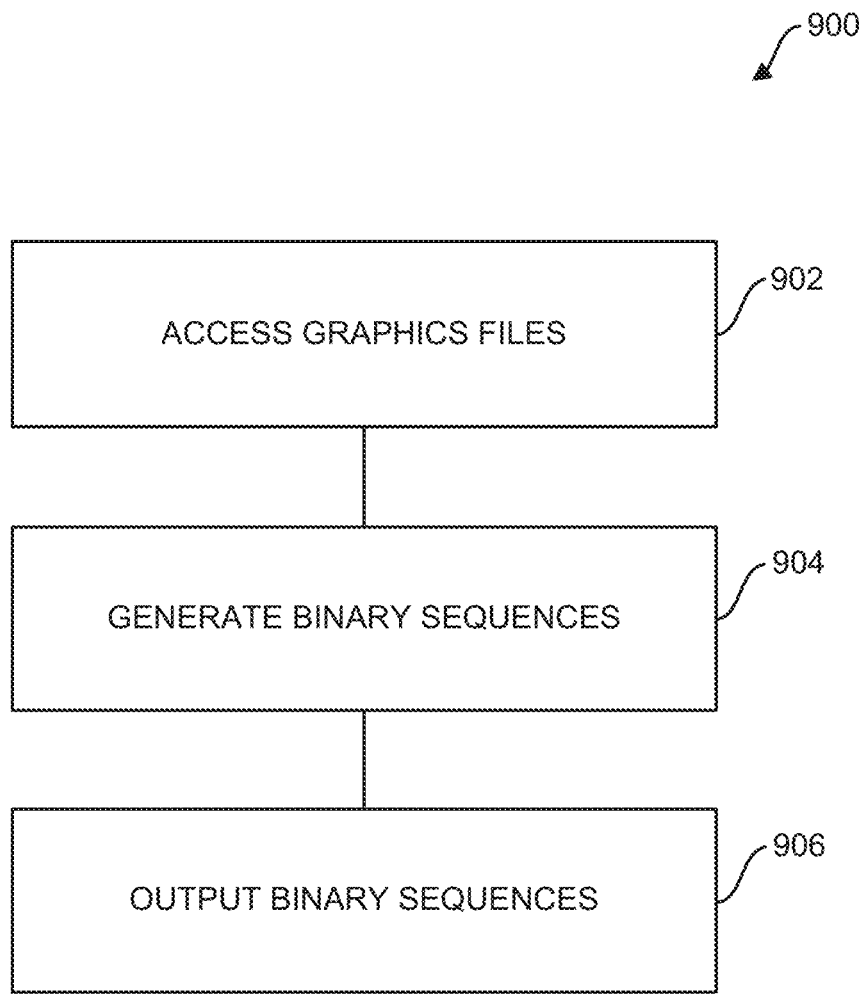
FIGS. 9-11 show examples of methods.
Figure 10:
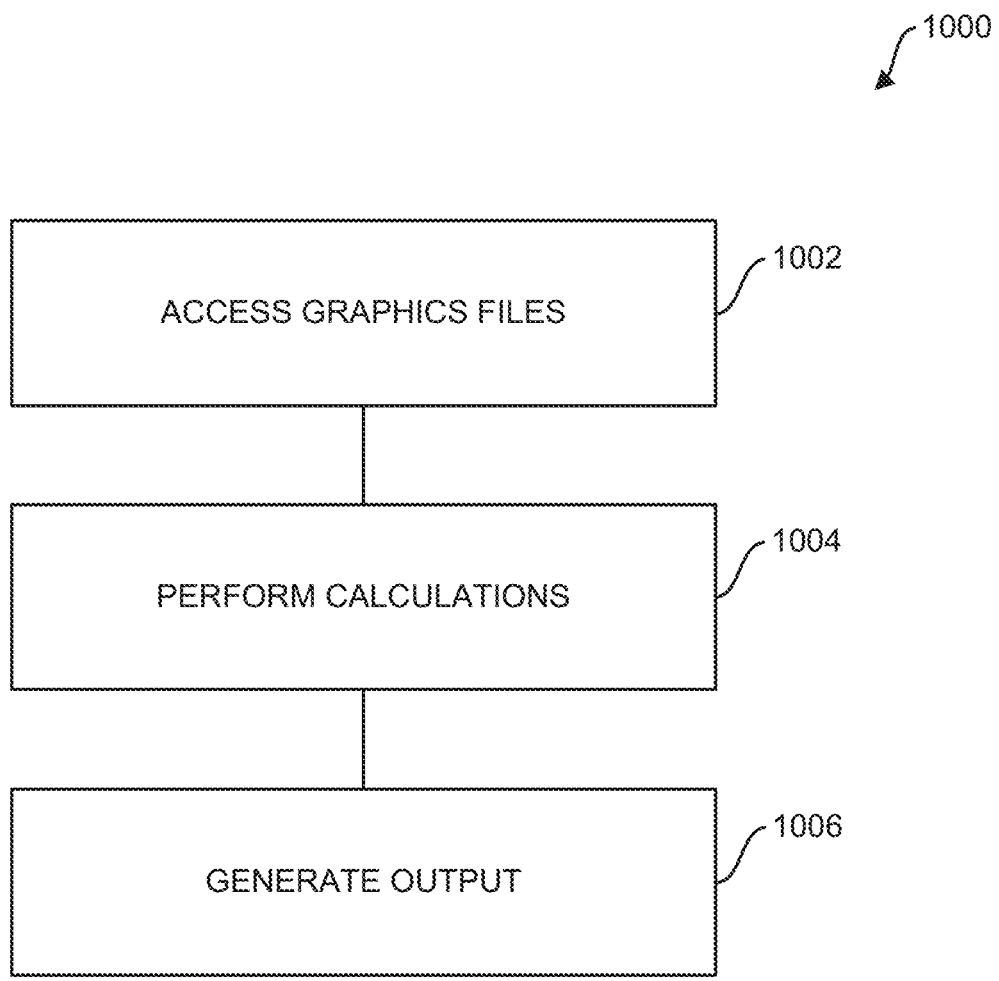
Figure 11:
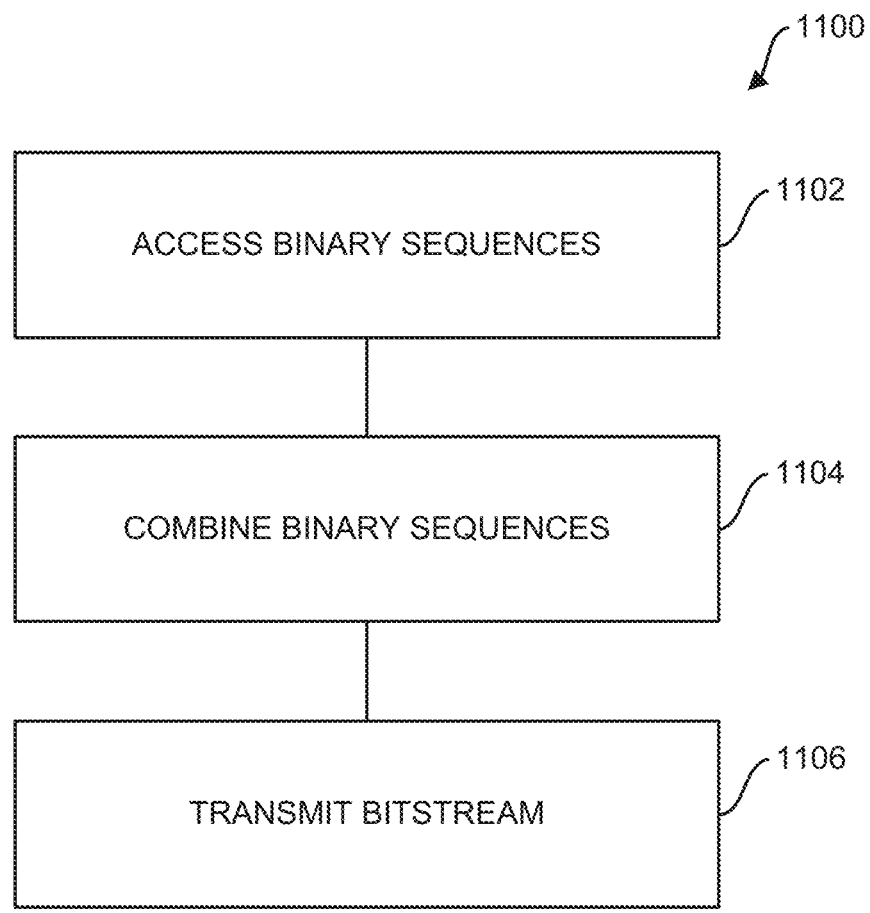

FIGS. 9-11 show examples of methods 900, 1000, and 1100, respectively. One or more of the methods 900, 1000, and 1100 can be used with other examples described elsewhere herein. One or more operations of a method can be performed in a different order, and/or more or fewer operations can be performed, unless otherwise indicated.

Beginning with the method 900, at 902 animation graphics files and a mask graphics file can be accessed. For example, the graphics files can be generated using the system 100 and can be accessed by the conversion program 124 (FIG. 1).

At 904, first binary sequences corresponding to the respective animation graphics files, and a second binary sequence corresponding to the mask graphics file, can be generated. In some implementations, the conversion program 124 (FIG. 1) can convert decimal numbers from the pixel values of the animation graphics files and the mask graphics file into binary numbers. For example, the conversion program 124 (FIG. 1) can generate the output 126.

At 906, the first binary sequences and the second binary sequence can be output to hardware controlling an array of electrical components. For example, the binary sequences can be persisted by the system 100 (FIG. 1) in form of binary files, and the conversion program 124 can output the binary files to the system 200 (FIG. 2) controlling the array 206.

Turning now to the method 1000, at 1002 animation graphics files, a mask graphics file, and a value representing an electrical threshold for an array of electrical components, can be accessed. For example, the graphics files can be generated using the system 100 and can be accessed by the analysis program 120 (FIG. 1).

At 1004, pixel-by-pixel calculations can be performed on combinations of rows from the animation graphics files and the mask graphics file. The pixel-by-pixel calculations can include combinations of scaled pixel values from the animation graphics files as defined by a corresponding pixel value from the mask graphics file.

Referring again to FIG. 8, the animation graphics files 802 and 804 can be scaled and combined using the mask graphics file 806 in the pixel-by-pixel calculations at 1004. For example, the analysis program 120 (FIG. 1) can perform the pixel-by-pixel calculations. Each of the graphics files 800 can be looped through independently of the others in the pixel-by-pixel calculations. In some implementations, pixels in the rows of each of the graphics files 800 correspond to individual electrical components, and the respective rows of the graphics files 800 correspond to the passage of time during performance of a pattern. The hardware can constantly loop through all of the graphics files 800 (e.g., at a constant rate) in the pixel-by-pixel calculations. One or more of the graphics files 800 can have a different temporal length than another graphics file. As such, the processing of one of the graphics files 800 can start over (e.g., begin another loop) when reaching the end of that graphics file. For example, the processing in the pixel-by-pixel calculations can begin with a first row 808 of the animation graphics file 802, and with a first row 810 of the animation graphics file 804, and with a first row 812 of the mask graphics file 806. Each pixel-by-pixel calculation can involve scaling (e.g., multiplying) pixel values from the animation graphics files 802 and 804 with values from the mask graphics file 806, and summing the scaled pixel values. The pixel-by-pixel calculations can be performed in order for each of the pixels in the respective row of the graphics files 800. After the pixel-by-pixel calculations for one row are complete, the processing can continue with a next row in each of the graphics files 800. When reaching a final row 814 of the animation graphics file 804 in the pixel-by-pixel calculations, the processing can loop to the first row 810 of the animation graphics file 804 and continue with subsequent rows of the animation graphics file 802 and the mask graphics file 806. When reaching a final row 816 of the animation graphics file 802 in the pixel-by-pixel calculations, the processing can loop to the first row 808 of the animation graphics file 802 and continue with subsequent rows of the animation graphics file 804 and the mask graphics file 806. When reaching a final row 818 of the mask graphics file 806, the processing can loop to the first row 812 of the mask graphics file 806 and continue with subsequent rows of the animation graphics files 802 and 804. As such, the pixel-by-pixel calculations can be performed in multiple iterations of processing.

At 1006, an output can be generated that reflects whether an outcome of the pixel-by-pixel calculations complies with (e.g., does not exceed) the electrical threshold for the array of electrical components. For example, the analysis program 120 can generate the output 122 (e.g., a modification of the graphics file(s) and/or a calculated electrical value describing the array of electrical components). In some implementations, the output generated at 1006 can involve one or more manifestations perceivable by a user. For example, the display device 1338 (FIG. 13) can present a message that conveys whether the evaluated graphics files would exceed a predetermined electrical threshold, including, but not limited to, a current limit.

Turning now to the method 1100, at 1102 there can be accessed first binary sequences corresponding to animation graphics files, and a second binary sequence corresponding to a mask graphics file. For example, the system 200 can access the binary files 216 (FIG. 2) that the conversion program 124 may have generated by converting the animation graphics files 116 and the mask graphics file 118 (FIG. 1) from one numerical form (e.g., hexadecimal) to binary form.

At 1104, portions of the first binary sequences can be combined with each other according to the second binary sequence, to generate a digital bitstream. For example, the digital bitstream component 222 (FIG. 2) can combine the binary files corresponding to the examples described with reference to the graphics files 800 (FIG. 8) by performing binary multiplication of binary numbers, and by performing binary addition of binary products. The combination performed by the digital bitstream component 222 (FIG. 2) can generate the digital bitstream as a logic-level signal.

At 1106, the digital bitstream can be transmitted to control an array of electrical components. In some implementations, the hardware system 204 (FIG. 2) can transmit the digital bitstream on one or more electric conductors to control any of the electrical components described with reference to FIG. 4. For example, the digital bitstream can be transmitted to a driver for one or more of the electrical components.

Figure 12:
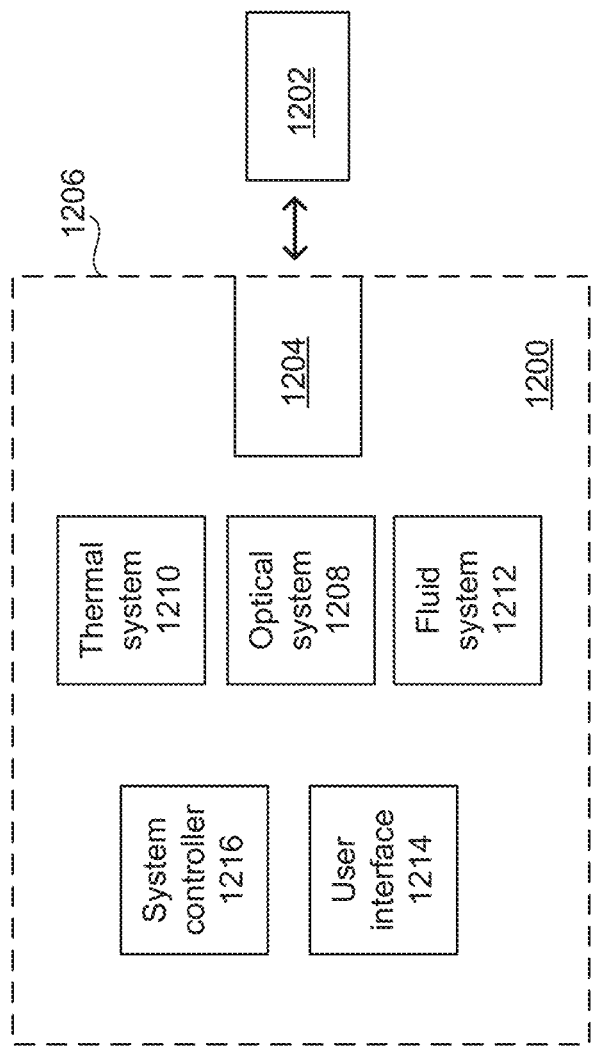
FIG. 12 is a schematic view of an example system that can be used for biological and/or chemical analysis.

FIG. 12 is a schematic view of an example system 1200 that can be used for biological and/or chemical analysis. Systems and/or techniques described herein can be part of the system 1200 in some implementations. The system 1200 can operate to obtain any information or data that relates to at least one biological and/or chemical substance. In some implementations, a carrier 1202 supplies material to be analyzed. For example, the carrier 1202 can include a cartridge or any other component holding the material. In some implementations, the system 1200 has a receptacle 1204 to receive the carrier 1202 at least during the analysis. The receptacle 1204 can form an opening in a housing 1206 of the system 1200. For example, some or all components of the system 1200 can be within the housing 1206.

The system 1200 can include an optical system 1208 for biological and/or chemical analysis of the material(s) of the carrier 1202. The optical system 1208 can perform one or more optical operations, including, but not limited to, illumination and/or imaging of the material(s). For example, the optical system 1208 can include any or all systems described elsewhere herein. As another example, the optical system 1208 can perform any or all operations described elsewhere herein.

The system 1200 can include a thermal system 1210 for providing thermal treatment relating to biological and/or chemical analysis. In some implementations, the thermal system 1210 thermally conditions at least part of the material(s) to be analyzed and/or the carrier 1202.

The system 1200 can include a fluid system 1212 for managing one or more fluids relating to biological and/or chemical analysis. In some implementations, the fluid(s) can be provided for the carrier 1202 or its material(s). For example, fluid can be added to and/or removed from the material of the carrier 1202.

The system 1200 includes a user interface 1214 that facilitates input and/or output relating to biological and/or chemical analysis. The user interface can be used to specify one or more parameters for the operation of the system 1200 and/or to output results of biological and/or chemical analysis, to name just a few examples. For example, the user interface 1214 can include one or more display screens (e.g., a touchscreen), a keyboard, and/or a pointing device (e.g., a mouse or a trackpad).

The system 1200 can include a system controller 1216 that can control one or more aspects of the system 1200 for performing biological and/or chemical analysis. The system controller 1216 can control the receptacle 1204, the optical system 1208, the thermal system 1210, the fluid system 1212, and/or the user interface 1214. The system controller 1216 can include at least one processor and at least one storage medium (e.g., a memory) with executable instructions for the processor.

Figure 13:
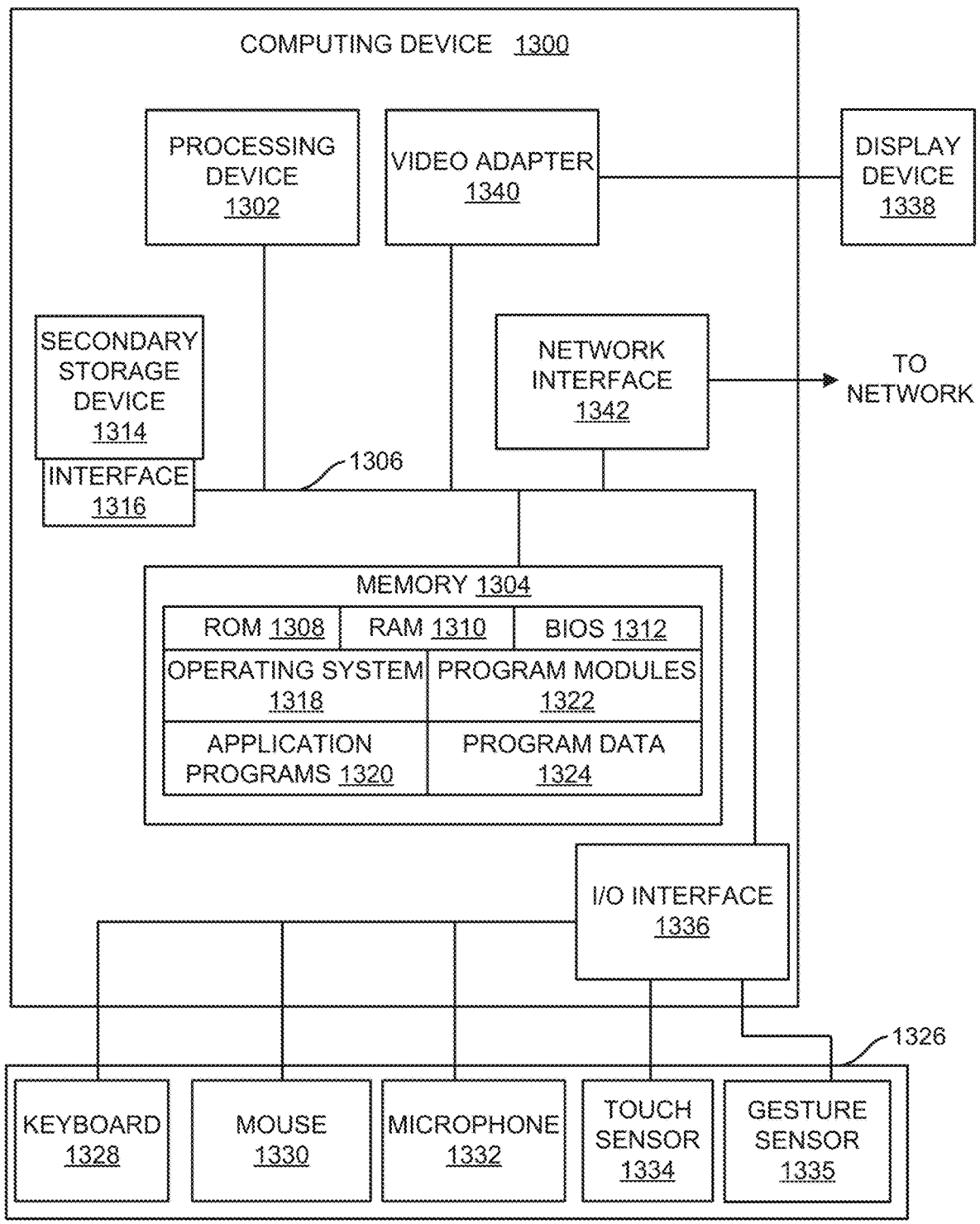
FIG. 13 illustrates an example architecture of a computing device.

FIG. 13 illustrates an example architecture of a computing device 1300 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 13 can be used to execute the operating system, application programs, and/or software modules (including the software engines) described herein.

The computing device 1300 includes, in some embodiments, at least one processing device 1302 (e.g., a processor), such as a central processing unit (CPU). A variety of processing devices are available from a variety of manufacturers, for example, Intel or Advanced Micro Devices. In this example, the computing device 1300 also includes a system memory 1304, and a system bus 1306 that couples various system components including the system memory 1304 to the processing device 1302. The system bus 1306 is one of any number of types of bus structures that can be used, including, but not limited to, a memory bus, or memory controller; a peripheral bus; and a local bus using any of a variety of bus architectures.

Examples of computing devices that can be implemented using the computing device 1300 include a desktop computer, a laptop computer, a tablet computer, a mobile computing device (such as a smart phone, a touchpad mobile digital device, or other mobile devices), or other devices configured to process digital instructions.

The system memory 1304 includes read only memory 1308 and random access memory 1310. A basic input/output system 1312 containing the basic routines that act to transfer information within computing device 1300, such as during start up, can be stored in the read only memory 1308.

The computing device 1300 also includes a secondary storage device 1314 in some embodiments, such as a hard disk drive, for storing digital data. The secondary storage device 1314 is connected to the system bus 1306 by a secondary storage interface 1316. The secondary storage device 1314 and its associated computer readable media provide nonvolatile and non-transitory storage of computer readable instructions (including application programs and program modules), data structures, and other data for the computing device 1300.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 1314 and/or system memory 1304, including an operating system 1318, one or more application programs 1320, other program modules 1322 (such as the software engines described herein), and program data 1324. The computing device 1300 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 1300 through one or more input devices 1326. Examples of input devices 1326 include a keyboard 1328, mouse 1330, microphone 1332 (e.g., for voice and/or other audio input), touch sensor 1334 (such as a touchpad or touch sensitive display), and gesture sensor 1335 (e.g., for gestural input. In some implementations, the input device(s) 1326 provide detection based on presence, proximity, and/or motion. In some implementations, a user may walk into their home, and this may trigger an input into a processing device. For example, the input device(s) 1326 may then facilitate an automated experience for the user. Other embodiments include other input devices 1326. The input devices can be connected to the processing device 1302 through an input/output interface 1336 that is coupled to the system bus 1306. These input devices 1326 can be connected by any number of input/output interfaces, such as a parallel port, serial port, game port, or a universal serial bus. Wireless communication between input devices 1326 and the input/output interface 1336 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 1338, such as a monitor, liquid crystal display device, projector, or touch sensitive display device, is also connected to the system bus 1306 via an interface, such as a video adapter 1340. In addition to the display device 1338, the computing device 1300 can include various other peripheral devices (not shown), such as speakers or a printer.

The computing device 1300 can be connected to one or more networks through a network interface 1342. The network interface 1342 can provide for wired and/or wireless communication. In some implementations, the network interface 1342 can include one or more antennas for transmitting and/or receiving wireless signals. When used in a local area networking environment or a wide area networking environment (such as the Internet), the network interface 1342 can include an Ethernet interface. Other possible embodiments use other communication devices. For example, some embodiments of the computing device 1300 include a modem for communicating across the network.

The computing device 1300 can include at least some form of computer readable media. Computer readable media includes any available media that can be accessed by the computing device 1300. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1300.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 13 is also an example of programmable electronics, which may include one or more such computing devices, and when multiple computing devices are included, such computing devices can be coupled together with a suitable data communication network so as to collectively perform the various functions, methods, or operations disclosed herein.

The following Examples illustrate some aspects of the present subject matter.

Example 1

A method comprising:
accessing animation graphics files and a mask graphics file;
generating first binary sequences corresponding to the animation graphics files, and generating a second binary sequence corresponding to the mask graphics file; and
outputting the first binary sequences and the second binary sequence to hardware controlling an array of electrical components.

Example 2

The method of Example 1, wherein outputting the first binary sequences and the second binary sequence comprises transmitting a binary file including the first binary sequences and the second binary sequence.

Example 3

The method of any of Examples 1 to 2, wherein the animation graphics files and the mask graphics file have a common graphics file type.

Example 4

The method of Example 3, wherein the common graphics file type supports lossless data compression.

Example 5

The method of any of Examples 1 to 4, wherein at least one of the animation graphics files or the mask graphics file has eight bits per color.

Example 6

The method of any of Examples 1 to 4, wherein at least one of the animation graphics files or the mask graphics file has 16 bits per color.

Example 7

The method of any of Examples 1 to 6, wherein at least one of the animation graphics files or the mask graphics file has three planes.

Example 8

The method of any of Examples 1 to 6, wherein at least one of the animation graphics files or the mask graphics file has four planes.

Example 9

The method of any of Examples 3 to 8, further comprising reading a first flag to distinguish the animation graphics files from the mask graphics file.

Example 10

The method of any of Examples 1 to 9, wherein at least one of generating the first binary sequences or generating the second binary sequence comprises reading a second flag indicating processing direction.

Example 11

The method of any of Examples 1 to 10, further comprising operating the array of electrical components using the first binary sequences and the second binary sequence.

Example 12

A computer program product stored in a non-transitory medium and including instructions that when executed by a processor cause the processor to perform operations, the operations comprising:
accessing animation graphics files and a mask graphics file;
generating first binary sequences corresponding to the animation graphics files, and generating a second binary sequence corresponding to the mask graphics file; and
outputting the first binary sequences and the second binary sequence to hardware controlling an array of electrical components.

Example 13

A method comprising:
accessing a first animation graphics file, a second animation graphics file, a mask graphics file, and a predetermined electrical threshold value for an array of electrical components;
performing pixel-by-pixel calculations on combinations of rows from the first animation graphics file and the second animation graphics file and the mask graphics file, each of the pixel-by-pixel calculations including determining a first scaled pixel value by multiplying a first animation pixel value from the first animation graphics file with a first mask pixel value from the mask graphics file, determining a second scaled pixel value by multiplying a second animation pixel value from the second animation graphics file with a second mask pixel value from the mask graphics file, and determining a sum of the first scaled pixel value and the second scaled pixel value; and generating an output that reflects whether an outcome of the pixel-by-pixel calculations exceeds the predetermined electrical threshold value for the array of electrical components.

Example 14

The method of Example 13, wherein performing the pixel-by-pixel calculations comprises performing the pixel-by-pixel calculations on all possible combinations of rows from the first animation graphics file, the second animation graphics file and the mask graphics file.

Example 15

The method of any of Examples 13 to 14, wherein the output indicates that the outcome of the pixel-by-pixel calculations exceeds the predetermined electrical threshold value for the array of electrical components, and wherein the method further comprises adjusting at least one of the first animation graphics file, the second animation graphics file or the mask graphics file.

Example 16

The method of Example 15, wherein the array of electrical components includes light-emitting diodes (LEDs), wherein the predetermined electrical threshold value includes an upper current limit, and wherein adjusting at least one of the first animation graphics file, the second animation graphics file or the mask graphics file comprises reducing a brightness value.

Example 17

The method of any of Examples 13 to 16, wherein the output indicates that the outcome of the pixel-by-pixel calculations does not exceed the predetermined electrical threshold value for the array of electrical components, and wherein the output further comprises a calculated electrical value describing the array of electrical components.

Example 18

The method of Example 17, wherein the calculated electrical value comprises an average total current for all row combinations of the first animation graphics file, the second animation graphics file and the mask graphics file.

Example 19

The method of any of Examples 17 to 18, wherein the calculated electrical value comprises a highest total current among all row combinations of the first animation graphics file, the second animation graphics file and the mask graphics file.

Example 20

The method of any of Examples 13 to 19, wherein the array of electrical components includes light-emitting diodes (LEDs).

Example 21

The method of Example 20, wherein the outcome of the pixel-by-pixel calculations comprises calculating an estimated current for each LED color of the LEDs based on data stored as pixels in the first animation graphics file and the second animation graphics file and the mask graphics file.

Example 22

The method of Example 21, wherein the estimated current for each LED color of the LEDs is at least one of an average or a maximum current.

Example 23

The method of any of Examples 20 to 22, wherein the outcome of the pixel-by-pixel calculations comprises an estimated current for each LED of the LEDs.

Example 24

The method of Example 23, wherein the estimated current for each LED of the LEDs is at least one of an average or a maximum current.

Example 25

The method of any of Examples 13 to 24, wherein each row in the first animation graphics file and the second animation graphics file is associated with a frame in a pattern sequence defined by the first animation graphics file and the second animation graphics file and the mask graphics file, and wherein each pixel in the row is associated with a respective electrical component of the array of electrical components.

Example 26

The method of Example 25, wherein performing the pixel-by-pixel calculations comprises processing a first row of each of the first animation graphics file and the second animation graphics file and the mask graphics file, and subsequently processing a next row of each of the first animation graphics file and the second animation graphics file and the mask graphics file over multiple iterations.

Example 27

The method of Example 26, wherein at least one of the first animation graphics file, the second animation graphics file or the mask graphics file has a different temporal length than another of the first animation graphics file, the second animation graphics file or the mask graphics file, the method further comprising beginning another loop of the at least one of the first animation graphics file, the second animation graphics file or the mask graphics file after reaching an end of the at least one of the first animation graphics file, the second animation graphics file or the mask graphics file.

Example 28

The method of any of Examples 13 to 27, wherein a series of rows in each of the first animation graphics file, the second animation graphics file and the mask graphics file is associated with a temporal flow of a pattern sequence defined by the first animation graphics file, the second animation graphics file and the mask graphics file.

Example 29

The method of any of Examples 13 to 28, wherein the first animation graphics file, the second animation graphics file and the mask graphics file have a common graphics file type.

Example 30

The method of Example 29, wherein the common graphics file type supports lossless data compression.

Example 31

The method of any of Examples 13 to 30, wherein at least one of the first animation graphics file, the second animation graphics file or the mask graphics file has eight bits per color.

Example 32

The method of any of Examples 13 to 30, wherein at least one of the first animation graphics file, the second animation graphics file or the mask graphics file has 16 bits per color.

Example 33

The method of any of Examples 13 to 32, wherein at least one of the first animation graphics file, the second animation graphics file or the mask graphics file has three planes.

Example 34

The method of any of Examples 13 to 32, wherein at least one of the first animation graphics file, the second animation graphics file or the mask graphics file has four planes.

Example 35

The method of any of Examples 13 to 34, wherein generating the output comprises presenting a message on a display device.

Example 36

The method of any of Examples 13 to 35, further comprising operating the array of electrical components based on the first animation graphics file and the second animation graphics file.

Example 37

A computer program product stored in a non-transitory medium and including instructions that when executed by a processor cause the processor to perform operations, the operations comprising:
  accessing a first animation graphics file, a second animation graphics file, a mask graphics file, and a predetermined electrical threshold value for an array of electrical components;
  performing pixel-by-pixel calculations on combinations of rows from the first animation graphics file, the second animation graphics file and the mask graphics file, each of the pixel-by-pixel calculations including determining a first scaled pixel value by multiplying a first animation pixel value from the first animation graphics file with a first mask pixel value from the mask graphics file, determining a second scaled pixel value by multiplying a second animation pixel value from the second animation graphics file with a second mask pixel value from the mask graphics file, and determining a sum of the first scaled pixel value and the second scaled pixel value; and
  generating an output that reflects whether an outcome of the pixel-by-pixel calculations exceeds the predetermined electrical threshold value for the array of electrical components.

Example 38

A method comprising:
  accessing first binary sequences corresponding to animation graphics files, and a second binary sequence corresponding to a mask graphics file;
  combining portions of the first binary sequences with each other according to the second binary sequence, to generate a digital bitstream; and
  transmitting the digital bitstream to control an array of electrical components.

Example 39

The method of Example 38, wherein each row in the animation graphics files is associated with a frame in a pattern sequence defined by the animation graphics files and the mask graphics file, and wherein each pixel in the row is associated with a respective electrical component of the array of electrical components.

Example 40

The method of any of Examples 38 to 39, wherein combining the portions of the first binary sequences with each other comprises processing a first row of each of the animation graphics files and the mask graphics file, and subsequently processing a next row of each of the animation graphics files and the mask graphics file over multiple iterations.

Example 41

The method of Example 40, wherein at least one of the animation graphics files or the mask graphics file has a different temporal length than another of the animation graphics files or the mask graphics file, the method further comprising beginning another loop of the at least one of the animation graphics files or the mask graphics file after reaching an end of the at least one of the animation graphics files or the mask graphics file.

Example 42

The method of any of Examples 38 to 41, wherein a series of rows in each of the animation graphics files or the mask graphics file is associated with a temporal flow of a pattern sequence defined by the animation graphics files and the mask graphics file.

Example 43

The method of any of Examples 38 to 42, further comprising accessing multiple second binary sequences corresponding to respective mask graphics files, and accessing a configuration file specifying combinations, each combination including at least two of the animation graphics files and one of the mask graphics files.

Example 44

The method of Example 43, wherein each of the combinations corresponds to either a stable state or a transition state.

Example 45

The method of Example 44, further comprising regulating change from a first stable state to a second stable state, wherein the configuration file specifies the transition state intermediate the first stable state and the second stable state.

Example 46

The method of any of Examples 38 to 45, wherein the array of electrical components includes light-emitting diodes (LEDs).

Example 47

The method of Example 46, wherein transmitting the digital bitstream to control the array of electrical components comprises transmitting the digital bitstream to drivers for respective ones of the LEDs.

Example 48

The method of Example 47, wherein transmitting the digital bitstream to the drivers for respective ones of the LEDs comprises transmitting the digital bitstream through a daisy chain of drivers.

Example 49

The method of any of Examples 38 to 48, further comprising generating the first binary sequences using the animation graphics files, and generating the second binary sequence using the mask graphics file.

Example 50

An apparatus comprising:
a non-volatile memory storing first binary sequences corresponding to respective animation graphics files, and a second binary sequence corresponding to a mask graphics file;
an array of electrical components; and
hardware that combines portions of the first binary sequences with each other according to the second binary sequence, to generate a digital bitstream for the array of electrical components.

Example 51

The apparatus of Example 50, wherein the array of electrical components includes light-emitting diodes (LEDs).

Example 52

The apparatus of Example 51, wherein generating the digital bitstream for the array of electrical components comprises transmitting the digital bitstream to drivers for respective ones of the LEDs.

Example 53

The apparatus of Example 52, wherein transmitting the digital bitstream to the drivers for respective ones of the LEDs comprises transmitting the digital bitstream through a daisy chain of drivers.

Example 54

The apparatus of Example 50, wherein the array of electrical components includes electric motors.

Example 55

The apparatus of Example 50, wherein the array of electrical components includes electric heaters.

Example 56

The apparatus of Example 50, wherein the array of electrical components includes electric actuators.

Example 57

The apparatus of any of Examples 50 to 56, wherein the hardware comprises:
a binary multiplier performing multiplication on at least part of the first binary sequences; and
a binary adder performing addition on a product generated by the binary multiplier.

Example 58

A set of graphics files comprising:
a first animation graphics (AG) file comprising first AG pixels, each of the first AG pixels comprising first AG values;
a second AG file comprising second AG pixels, each of the second AG pixels comprising second AG values; and
a mask graphics (MG) file comprising MG pixels, each of the MG pixels comprising MG values, a first MG value of the MG values specifying a first numerical factor for one of the first AG values, a second MG value of the MG values specifying a second numerical factor for one of the second AG values, the MG pixel defining a sum of (i) the first numerical factor multiplied by the one of the first AG values, and (ii) the second numerical factor multiplied by the one of the second AG values.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer program product stored in a non-transitory medium and including instructions that when executed by a processor cause the processor to perform operations, the operations comprising:
accessing a first animation graphics file, a second animation graphics file, a mask graphics file, and a predetermined electrical threshold value for an array of electrical components;
performing pixel-by-pixel calculations on combinations of rows from the first animation graphics file and the second animation graphics file and the mask graphics file, each of the pixel-by-pixel calculations including determining a first scaled pixel value by multiplying a first animation pixel value from the first animation graphics file with a first mask pixel value from the mask graphics file, determining a second scaled pixel value by multiplying a second animation pixel value from the second animation graphics file with a second mask pixel value from the mask graphics file, and determining a sum of the first scaled pixel value and the second scaled pixel value; and
generating an output that reflects whether an outcome of the pixel-by-pixel calculations exceeds the predetermined electrical threshold value for the array of electrical components.

2. The computer program product of claim 1, wherein performing the pixel-by-pixel calculations comprises performing the pixel-by-pixel calculations on all possible combinations of rows from the first animation graphics file, the second animation graphics file and the mask graphics file.

3. The computer program product of claim 1, wherein the output indicates that the outcome of the pixel-by-pixel calculations exceeds the predetermined electrical threshold value for the array of electrical components, and wherein the operations further comprise adjusting at least one of the first animation graphics file, the second animation graphics file or the mask graphics file.

4. The computer program product of claim 1, wherein the output indicates that the outcome of the pixel-by-pixel calculations does not exceed the predetermined electrical threshold value for the array of electrical components, and wherein the output further comprises a calculated electrical value describing the array of electrical components.

5. The computer program product of claim 4, wherein the calculated electrical value comprises an average total current for all row combinations of the first animation graphics file, the second animation graphics file and the mask graphics file.

6. The computer program product of claim 4, wherein the calculated electrical value comprises a highest total current among all row combinations of the first animation graphics file, the second animation graphics file and the mask graphics file.

7. The computer program product of claim 1, wherein the array of electrical components includes light-emitting diodes (LEDs), and wherein the outcome of the pixel-by-pixel calculations comprises calculating an estimated current for each LED color of the LEDs based on data stored as pixels in the first animation graphics file and the second animation graphics file and the mask graphics file.

8. The computer program product of claim 1, wherein each row in the first animation graphics file and the second animation graphics file is associated with a frame in a pattern sequence defined by the first animation graphics file and the second animation graphics file and the mask graphics file, and wherein each pixel in the row is associated with a respective electrical component of the array of electrical components.

9. The computer program product of claim 8, wherein performing the pixel-by-pixel calculations comprises processing a first row of each of the first animation graphics file and the second animation graphics file and the mask graphics file, and subsequently processing a next row of each of the first animation graphics file and the second animation graphics file and the mask graphics file over multiple iterations.

10. The computer program product of claim 9, wherein at least one of the first animation graphics file, the second animation graphics file or the mask graphics file has a different temporal length than another of the first animation graphics file, the second animation graphics file or the mask graphics file, the operations further comprising beginning another loop of the at least one of the first animation graphics file, the second animation graphics file or the mask graphics file after reaching an end of the at least one of the first animation graphics file, the second animation graphics file or the mask graphics file.

11. The computer program product of claim 1, wherein a series of rows in each of the first animation graphics file, the second animation graphics file and the mask graphics file is associated with a temporal flow of a pattern sequence defined by the first animation graphics file, the second animation graphics file and the mask graphics file.

12. A method comprising:
   accessing first binary sequences corresponding to animation graphics files, and a second binary sequence corresponding to a mask graphics file;
   combining portions of the first binary sequences with each other according to the second binary sequence, to generate a digital bitstream; and
   transmitting the digital bitstream to control an array of electrical components.

13. The method of claim 12, wherein each row in the animation graphics files is associated with a frame in a pattern sequence defined by the animation graphics files and the mask graphics file, and wherein each pixel in the row is associated with a respective electrical component of the array of electrical components.

14. The method of claim 12, wherein at least one of the animation graphics files or the mask graphics file has a different temporal length than another of the animation graphics files or the mask graphics file, the method further comprising beginning another loop of the at least one of the animation graphics files or the mask graphics file after reaching an end of the at least one of the animation graphics files or the mask graphics file.

15. The method of claim 12, further comprising accessing multiple second binary sequences corresponding to respective mask graphics files, and accessing a configuration file specifying combinations, each combination including at least two of the animation graphics files and one of the mask graphics files.

16. The method of claim 15, wherein each of the combinations corresponds to either a stable state or a transition state, the method further comprising regulating change from a first stable state to a second stable state, wherein the configuration file specifies the transition state intermediate the first stable state and the second stable state.

17. An apparatus comprising:
   a non-volatile memory storing first binary sequences corresponding to respective animation graphics files, and a second binary sequence corresponding to a mask graphics file;
   an array of electrical components; and
   hardware that combines portions of the first binary sequences with each other according to the second binary sequence, to generate a digital bitstream for the array of electrical components.

18. The apparatus of claim 17, wherein the array of electrical components includes light-emitting diodes (LEDs), and wherein generating the digital bitstream for the array of electrical components comprises transmitting the digital bitstream to drivers for respective ones of the LEDs.

19. The apparatus of claim 18, wherein transmitting the digital bitstream to the drivers for respective ones of the LEDs comprises transmitting the digital bitstream through a daisy chain of drivers.

20. The apparatus of claim 17, wherein the hardware comprises:
   a binary multiplier performing multiplication on at least part of the first binary sequences; and
   a binary adder performing addition on a product generated by the binary multiplier.

\* \* \* \* \*

UNITED STATES PATENT AND TRADEMARK OFFICE
CERTIFICATE OF CORRECTION

PATENT NO. : 11,386,603 B2
APPLICATION NO. : 17/247133
DATED : July 12, 2022
INVENTOR(S) : Brian Sinofsky et al.

It is certified that error appears in the above-identified patent and that said Letters Patent is hereby corrected as shown below:

In the Specification

In Column 1, Line 7, after "application" delete "is a continuation of, and", therefor.

Signed and Sealed this
Twenty-fifth Day of October, 2022

Katherine Kelly Vidal
*Director of the United States Patent and Trademark Office*